(12) United States Patent
Blaser et al.

(10) Patent No.: US 9,959,432 B2
(45) Date of Patent: May 1, 2018

(54) AUTHORIZATION CONTROL FOR AN ANTI-THEFT SECURITY SYSTEM

(71) Applicant: Mobile Tech, Inc., Lake Oswego, OR (US)

(72) Inventors: Robert Logan Blaser, Farmington, UT (US); Kristopher Wendell Schatz, Hillsboro, OR (US); Hunter Anderson Wylie, Sherwood, OR (US)

(73) Assignee: MOBILE TECH, INC., Lake Oswego, OR (US)

( * ) Notice: Subject to any disclaimer, the term of this patent is extended or adjusted under 35 U.S.C. 154(b) by 0 days. days.

(21) Appl. No.: 15/488,370

(22) Filed: Apr. 14, 2017

(65) Prior Publication Data

US 2017/0300721 A1    Oct. 19, 2017

Related U.S. Application Data

(60) Provisional application No. 62/323,466, filed on Apr. 15, 2016, provisional application No. 62/323,511, filed on Apr. 15, 2016.

(51) Int. Cl.
*G06F 21/00* (2013.01)
*G06F 21/88* (2013.01)
(Continued)

(52) U.S. Cl.
CPC ............ *G06F 21/88* (2013.01); *G06F 21/31* (2013.01); *G06F 21/45* (2013.01); *G08B 13/2431* (2013.01)

(58) Field of Classification Search
USPC ...................................... 726/1, 17
See application file for complete search history.

(56) References Cited

U.S. PATENT DOCUMENTS

| 88,335 A | 3/1908 | O'Connor |
| 3,444,547 A | 5/1969 | Surek |

(Continued)

FOREIGN PATENT DOCUMENTS

| AT | 506665 A1 | 10/2009 |
| CA | 2465692 A1 | 11/2004 |

(Continued)

OTHER PUBLICATIONS 35 mm Camera Display—Walmart Publication 1995, pp. 1-5.
(Continued)

*Primary Examiner* — Jason Lee
(74) *Attorney, Agent, or Firm* — Thompson Coburn LLP

(57) ABSTRACT

Improved systems and techniques are disclosed for controlling the security states of anti-theft security systems such as product display assemblies using security fobs. According to an example embodiment, a manager security fob and another security fob that is to be authorized for use in controlling the security status of a product display assembly can interact with a system in accordance with a defined sequence to add the another security fob to an authorization list for the product display assembly. For example, the defined sequence can be a connection of the manager security fob with the system, followed by a disconnection of the manager security fob from the system, followed a connection of the another security fob with the system within a defined window.

30 Claims, 17 Drawing Sheets

(51) Int. Cl.
*G06F 21/31* (2013.01)
*G06F 21/45* (2013.01)
*G08B 13/24* (2006.01)

(56) References Cited

U.S. PATENT DOCUMENTS

| | | | |
|---|---|---|---|
| 3,780,909 A | 12/1973 | Callahan et al. | |
| 4,075,878 A | 2/1978 | Best | |
| 4,117,465 A | 9/1978 | Timblin | |
| 4,335,931 A | 6/1982 | Kinnear | |
| 4,354,613 A | 10/1982 | Desai et al. | |
| 4,384,688 A | 5/1983 | Smith | |
| 4,590,337 A | 5/1986 | Engelmore | |
| 4,714,184 A | 12/1987 | Young et al. | |
| 4,772,878 A | 9/1988 | Kane | |
| 4,898,493 A | 2/1990 | Blankenburg | |
| 5,072,213 A | 12/1991 | Close | |
| 5,146,205 A | 9/1992 | Keifer et al. | |
| 5,176,465 A | 1/1993 | Holsted | |
| 5,246,183 A | 9/1993 | Leyden | |
| 5,543,782 A | 8/1996 | Rothbaum et al. | |
| 5,685,436 A | 11/1997 | Davet | |
| 5,861,807 A | 1/1999 | Leyden et al. | |
| 6,039,496 A | 3/2000 | Bishop | |
| 6,170,775 B1 | 1/2001 | Kovacik et al. | |
| 6,236,435 B1 | 5/2001 | Gertz | |
| 6,380,855 B1 | 4/2002 | Ott | |
| 6,386,906 B1 | 5/2002 | Burke | |
| 6,476,717 B1 | 11/2002 | Gross et al. | |
| 6,502,727 B1 | 1/2003 | Decoteau | |
| 6,581,421 B2 | 6/2003 | Chmela et al. | |
| 6,659,382 B2 | 12/2003 | Ryczek | |
| 6,731,212 B2 | 5/2004 | Hirose et al. | |
| 6,748,707 B1 | 6/2004 | Buchalter et al. | |
| 6,761,579 B2 | 7/2004 | Fort et al. | |
| 6,786,766 B1 | 9/2004 | Chopra | |
| 6,799,994 B2 | 10/2004 | Burke | |
| 6,831,560 B2 | 12/2004 | Gresset | |
| 6,896,543 B2 | 5/2005 | Fort et al. | |
| 6,946,961 B2 | 9/2005 | Frederiksen et al. | |
| 6,961,401 B1 | 11/2005 | Nally et al. | |
| 7,015,596 B2 | 3/2006 | Pail | |
| 7,053,774 B2 | 5/2006 | Sedon et al. | |
| 7,081,822 B2 | 7/2006 | Leyden et al. | |
| 7,101,187 B1 | 9/2006 | Deconinck et al. | |
| 7,132,952 B2 | 11/2006 | Leyden et al. | |
| 7,135,972 B2 | 11/2006 | Bonato | |
| 7,154,039 B1 | 12/2006 | Marszalek et al. | |
| 7,209,038 B1 | 4/2007 | Deconinck et al. | |
| 7,287,652 B2 | 10/2007 | Scholen et al. | |
| 7,385,522 B2 | 6/2008 | Belden, Jr. et al. | |
| 7,387,003 B2 | 6/2008 | Marszalek et al. | |
| 7,394,346 B2 | 7/2008 | Bodin | |
| 7,446,659 B2 | 11/2008 | Marsilio et al. | |
| 7,522,047 B2 | 4/2009 | Belden, Jr. et al. | |
| 7,626,500 B2 | 12/2009 | Belden, Jr. et al. | |
| 7,667,601 B2 | 2/2010 | Rabinowitz et al. | |
| 7,688,205 B2 | 3/2010 | Ott | |
| 7,710,266 B2 | 5/2010 | Belden, Jr. et al. | |
| 7,724,135 B2 | 5/2010 | Rapp et al. | |
| 7,737,843 B2 | 6/2010 | Belden, Jr. et al. | |
| 7,737,844 B2 | 6/2010 | Scott et al. | |
| 7,737,845 B2 | 6/2010 | Fawcett et al. | |
| 7,737,846 B2 | 6/2010 | Belden, Jr. et al. | |
| 7,744,404 B1 | 6/2010 | Henson et al. | |
| 7,762,457 B2 | 7/2010 | Bonalle et al. | |
| 7,762,470 B2 | 7/2010 | Finn et al. | |
| 7,909,641 B1 | 3/2011 | Henson et al. | |
| 7,969,305 B2 | 6/2011 | Belden, Jr. et al. | |
| 7,971,845 B2 | 7/2011 | Galant | |
| 8,009,348 B2 | 8/2011 | Zehner et al. | |
| D649,076 S | 11/2011 | Alexander | |
| 8,102,262 B2 | 1/2012 | Irmscher et al. | |
| D663,972 S | 7/2012 | Alexander et al. | |
| 8,499,384 B2 | 8/2013 | Zerhusen | |
| 8,558,688 B2 | 10/2013 | Henson et al. | |
| 8,698,618 B2 | 4/2014 | Henson et al. | |
| 8,749,194 B1 | 6/2014 | Kelsch et al. | |
| 8,847,759 B2 | 9/2014 | Bisesti et al. | |
| 8,884,762 B2 | 11/2014 | Fawcett et al. | |
| 8,896,447 B2 | 11/2014 | Fawcett et al. | |
| 8,955,807 B2 | 2/2015 | Alexander et al. | |
| 8,963,498 B2 | 2/2015 | Ferguson | |
| 8,989,954 B1 * | 3/2015 | Addepalli | H04W 4/046 370/328 |
| 9,092,960 B2 | 7/2015 | Wheeler | |
| 9,097,380 B2 | 8/2015 | Wheeler | |
| 9,135,800 B2 | 9/2015 | Fawcett et al. | |
| 9,171,441 B2 | 10/2015 | Fawcett et al. | |
| 9,220,358 B2 | 12/2015 | Wheeler et al. | |
| 9,269,247 B2 | 2/2016 | Fawcett et al. | |
| 9,303,809 B2 | 4/2016 | Reynolds et al. | |
| 9,373,236 B2 | 6/2016 | Oehl et al. | |
| 9,396,631 B2 | 7/2016 | Fawcett et al. | |
| 9,443,404 B2 | 9/2016 | Grant et al. | |
| 9,478,110 B2 | 10/2016 | Fawcett et al. | |
| 9,576,452 B2 | 2/2017 | Fawcett et al. | |
| 9,659,472 B2 | 5/2017 | Fawcett et al. | |
| 2001/0049222 A1 | 12/2001 | Fort et al. | |
| 2002/0085343 A1 | 7/2002 | Wu et al. | |
| 2002/0099945 A1 | 7/2002 | McLintock et al. | |
| 2002/0162366 A1 | 11/2002 | Chmela et al. | |
| 2003/0007634 A1 | 1/2003 | Wang | |
| 2003/0010859 A1 | 1/2003 | Ryczek | |
| 2004/0003150 A1 | 1/2004 | Deguchi | |
| 2004/0077210 A1 | 4/2004 | Kollmann | |
| 2004/0201449 A1 | 10/2004 | Denison et al. | |
| 2005/0073413 A1 | 4/2005 | Sedon et al. | |
| 2005/0088572 A1 | 4/2005 | Pandit et al. | |
| 2005/0165806 A1 | 7/2005 | Roatis et al. | |
| 2005/0206522 A1 | 9/2005 | Leyden et al. | |
| 2006/0001541 A1 | 1/2006 | Leyden et al. | |
| 2006/0170533 A1 | 8/2006 | Chioiu et al. | |
| 2006/0281484 A1 * | 12/2006 | Kronlund | H04M 1/006 455/550.1 |
| 2007/0075914 A1 | 4/2007 | Bates | |
| 2007/0159328 A1 | 7/2007 | Belden et al. | |
| 2007/0229259 A1 | 10/2007 | Irmscher et al. | |
| 2007/0245369 A1 | 10/2007 | Thompson et al. | |
| 2008/0094220 A1 | 4/2008 | Foley et al. | |
| 2008/0168806 A1 | 7/2008 | Belden et al. | |
| 2008/0169923 A1 | 7/2008 | Belden et al. | |
| 2008/0222849 A1 | 9/2008 | Lavoie | |
| 2009/0007390 A1 | 1/2009 | Tsang et al. | |
| 2009/0033492 A1 | 2/2009 | Rapp et al. | |
| 2009/0061863 A1 * | 3/2009 | Huggett | H04L 63/101 455/434 |
| 2009/0173868 A1 | 7/2009 | Fawcett et al. | |
| 2010/0065632 A1 | 3/2010 | Babcock et al. | |
| 2010/0315197 A1 * | 12/2010 | Solomon | G06F 21/31 340/5.2 |
| 2011/0053557 A1 | 3/2011 | Despain et al. | |
| 2011/0068919 A1 | 3/2011 | Rapp et al. | |
| 2011/0254661 A1 | 10/2011 | Fawcett et al. | |
| 2011/0283754 A1 | 11/2011 | Ezzo et al. | |
| 2011/0303816 A1 | 12/2011 | Horvath et al. | |
| 2011/0309934 A1 | 12/2011 | Henson et al. | |
| 2012/0037783 A1 | 2/2012 | Alexander et al. | |
| 2012/0043451 A1 | 2/2012 | Alexander et al. | |
| 2012/0126943 A1 * | 5/2012 | Biondo | G07C 9/00182 340/5.64 |
| 2012/0205325 A1 | 8/2012 | Richter et al. | |
| 2012/0205326 A1 | 8/2012 | Richter et al. | |
| 2012/0217371 A1 | 8/2012 | Abdollahzadeh et al. | |
| 2012/0280810 A1 | 11/2012 | Wheeler | |
| 2012/0286118 A1 | 11/2012 | Richards | |
| 2013/0026322 A1 | 1/2013 | Wheeler et al. | |
| 2013/0043369 A1 | 2/2013 | Wheeler | |
| 2013/0109375 A1 * | 5/2013 | Zeiler | H04W 4/028 455/426.1 |
| 2013/0161054 A1 | 6/2013 | Allison et al. | |
| 2013/0168527 A1 | 7/2013 | Wheeler et al. | |
| 2013/0196530 A1 * | 8/2013 | Cheatham | H01R 13/62 439/357 |

(56) References Cited

U.S. PATENT DOCUMENTS

| | | |
|---|---|---|
| 2013/0238516 A1 | 9/2013 | Moock et al. |
| 2013/0268316 A1 | 10/2013 | Moock et al. |
| 2014/0043162 A1 | 2/2014 | Siciliano et al. |
| 2014/0091932 A1 | 4/2014 | Mohiuddin et al. |
| 2014/0168884 A1 | 6/2014 | Wylie |
| 2014/0237236 A1* | 8/2014 | Kalinichenko ......... G06F 21/43 713/168 |
| 2014/0277837 A1 | 9/2014 | Hatton |
| 2014/0313010 A1 | 10/2014 | Huang et al. |
| 2015/0022332 A1* | 1/2015 | Lin ..................... B60R 25/00 340/426.1 |
| 2015/0048625 A1 | 2/2015 | Weusten et al. |
| 2015/0091729 A1 | 4/2015 | Phillips et al. |
| 2015/0213067 A1 | 7/2015 | Yin |
| 2015/0279130 A1 | 10/2015 | Robertson et al. |
| 2015/0348381 A1 | 12/2015 | Fawcett et al. |
| 2016/0042620 A1 | 2/2016 | Dandie et al. |
| 2016/0239796 A1 | 8/2016 | Grant et al. |
| 2016/0307209 A1 | 10/2016 | Marszalek |
| 2016/0307415 A1 | 10/2016 | Marszalek et al. |
| 2016/0307416 A1 | 10/2016 | Marszalek et al. |
| 2016/0308952 A1 | 10/2016 | Marszalek et al. |
| 2016/0335859 A1 | 11/2016 | Sankey |
| 2016/0379455 A1 | 12/2016 | Grant et al. |
| 2017/0154508 A1 | 6/2017 | Grant et al. |
| 2017/0193780 A1 | 7/2017 | Moock et al. |

FOREIGN PATENT DOCUMENTS

| | | |
|---|---|---|
| DE | 202009013722 U1 | 1/2011 |
| EP | 0745747 A1 | 12/1996 |
| EP | 1575249 A2 | 9/2005 |
| ES | 1058183 U | 11/2004 |
| FR | 2595227 A1 | 9/1987 |
| FR | 2768906 A1 | 4/1999 |
| FR | 2868459 A1 | 10/2005 |
| GB | 2427056 A | 12/2006 |
| GB | 2440600 A | 2/2008 |
| JP | H0573857 U | 10/1993 |
| JP | H0668913 A | 3/1994 |
| JP | 1997-259368 | 10/1997 |
| JP | 3100287 B2 | 10/2000 |
| KR | 20140126675 A | 10/2014 |
| WO | 1997031347 A1 | 8/1997 |
| WO | 2004038670 A1 | 5/2004 |
| WO | 2009/042905 A1 | 4/2009 |
| WO | 2012039794 A1 | 3/2012 |
| WO | 2012069816 A1 | 5/2012 |
| WO | 2012151130 A2 | 11/2012 |
| WO | 2013015855 A2 | 1/2013 |
| WO | 2013068036 A1 | 5/2013 |
| WO | 2013134484 A1 | 9/2013 |
| WO | 2014019072 A1 | 2/2014 |
| WO | 2014107184 A2 | 7/2014 |
| WO | 2014134718 A1 | 9/2014 |
| WO | 2015050710 A2 | 4/2015 |
| WO | 2015051840 A1 | 4/2015 |
| WO | 2015/112336 A1 | 7/2015 |
| WO | 2016/130762 A1 | 8/2016 |
| WO | 2016/179250 A2 | 11/2016 |

OTHER PUBLICATIONS

Corrected Petition for Inter Partes Review of Claims 1-24 of U.S. Pat. No. 9,269,247, Case IPR2016-00898, Apr. 19, 2016, pp. 1-65.
Corrected Petition for Inter Partes Review of Claims 1-34 of U.S. Pat. No. 9,135,800, Case IPR2016-00895, Filed Apr. 19, 2016, pp. 1-66.
Corrected Petition for Inter Partes Review of Claims 35-49 of U.S. Pat. No. 9,135,800, Case IPR2016-00896, Filed Apr. 19, 2016, pp. 1-64.
Decision Institution of Inter Partes Review for U.S. Pat. No. 9,269,247, Case IPR2016-00898, dated Sep. 29, 2016, pp. 1-29.
Decision Institution of Inter Partes Review for U.S. Pat. No. 9,269,247, Case IPR2016-00899, Sep. 29, 2016, pp. 1-25.
Decision Institution of Inter Partes Review of U.S. Pat. No. 9,396,631, Case IPR2017-00344, dated May 26, 2017, pp. 1-17.
Decision Institution of Inter Partes Review of U.S. Pat. No. 9,396,631, Case IPR2017-00345, dated May 26, 2017, pp. 1-18.
Decision of Institution of Inter Partes Review of U.S. Pat. No. 7,737,844, Case IPR2016-01915, filed Mar. 30, 2017, pp. 1-30.
Decision of Institution of Inter Partes Review of U.S. Pat. No. 7,737,846, Case IPR2016-01241, Dec. 20, 2016, pp. 1-22.
Decision of Institution of Inter Partes Review of U.S. Pat. No. 8,884,762, Case IPR2016-00892, filed Oct. 7, 2016, pp. 1-25.
Decision of Institution of Inter Partes Review of U.S. Pat. No. 9,135,800, Case IPR2016-00895, Filed Oct. 13, 2016, pp. 1-29.
Decision of Institution of Inter Partes Review of U.S. Pat. No. 9,135,800, Case IPR2016-00896, Filed Oct. 13, 2016, pp. 1-23.
Declaration of Christopher J. Fawcett in Support of Patent Owner's Response of U.S. Pat. No. 7,737,846, Case IPR2016-01241, Mar. 3, 2017, pp. 1-25.
Declaration of Christopher J. Fawcett in Support of Patent Owner's Responses for IPR2016-00895 and IPR2016-00896 dated Jan. 11, 2017, pp. 1-55.
Declaration of Harry Direen, PH. D, P.E. In Support of Patent Owner's Preliminary Responses for IPR2016-00892,-00895, -00896, -00898, and -00899, filed Jul. 18, 2016, pp. 1-41.
Declaration of Mike Cook, *Vanguard Products Group, Inc.* v. *Merchandising Technologies, Inc.*, Case No. 3:10-av-392-BR, U.S. District Court for the District of Oregon, Oct. 20, 2010, pp. 1-7.
Declaration of Thaine Allison in Support of Patent Owner's Reply to Petitioner's Opposition to Patent Owner's Motion to Amend, Inter Partes Review of U.S. Pat. No. 7,909,641, Case IPR2013-00122, dated Feb. 5, 2014, pp. 1-13.
Declaration of Thaine H. Allison III for U.S. Pat. No. 9,269,247, Case IPR2016-00898, dated Apr. 11, 2016, pp. 1-102.
Declaration of Thaine H. Allison III for U.S. Pat. No. 9,269,247, Case IPR2016-00899, Apr. 11, 2016, pp. 1-106.
Declaration of Thaine H. Allison III for U.S. Pat. No. 9,396,631, Case IPR2017-00344, Nov. 22, 2016, pp. 1-96.
Declaration of Thaine H. Allison III for U.S. Pat. No. 9,396,631, Case IPR2017-00345, Nov. 22, 2016, pp. 1-92.
Declaration of Thaine H. Allison III for U.S. Pat. No. 9,478,110, Case IPR2017-01900, Jul. 25, 2017, pp. 1-93.
Declaration of Thaine H. Allison III, for U.S. Pat. No. 9,478,110, Case IPR2017-01901, dated Jul. 27, 2017, pp. 1-117.
Declaration of Thaine H. Allison, III for U.S. Pat. No. 8,884,762, Case IPR2016-00892, filed Apr. 11, 2016, pp. 1-116.
Declaration of Thaine H. Allison, III for U.S. Pat. No. 9,135,800, Case IPR2016-00895, Filed Apr. 11, 2016, pp. 1-115.
Declaration of Thaine H. Allison, III for U.S. Pat. No. 9,135,800, Case IPR2016-00896, Filed Apr. 11, 2016, pp. 1-103.
Declaration of Thaine H. Allison, III, U.S. Pat. No. 7,737,844, Case IPR2016-01915, filed Jul. 30, 2016, pp. 1-117.
Declaration of Thaine H. Allison, III, U.S. Pat. No. 7,737,846, Case IPR2016-01241, Jun. 15, 2016, pp. 1-104.
Deposition of Thaine Allison, III, taken in behalf of Petition, dated Feb. 24, 2014, U.S. Pat. No. 7,909,641, Case IPR2013-00122, pp. 1-198.
Excerpts from Bruce Schneier, Applied Cryptography: Protocols, Algorithms, and Source Code in C, 1994, 14 pages.
International Search Report and Written Opinion for PCT/US2011/037235 dated Oct. 21, 2011.
International Search Report and Written Opinion for PCT/US2017/027801 dated Aug. 29, 2017.
Mobile Tech Inc.'s Reply to Patent Owner's Response of U.S. Pat. No. 7,737,846, Case IPR2016-01241, May 15, 2017, pp. 1-29.
Mobile Tech Inc.'s Reply to Patent Owner's Response of U.S. Pat. No. 8,884,762, Case IPR2016-00892, filed Apr. 13, 2017, pp. 1-30.
Mobile Tech Inc.'s Reply to Patent Owner's Response of U.S. Pat. No. 9,135,800, Case IPR2016-00895, filed Apr. 13, 2017, pp. 1-32.
Mobile Tech Inc.'s Reply to Patent Owner's Response of U.S. Pat. No. 9,269,247, Case IPR2016-00899, Apr. 13, 2017, pp. 1-31.

(56) References Cited

OTHER PUBLICATIONS

Mobile Tech Inc.'s Reply to Patent Owner's Response, Inter Partes Review of U.S. Pat. No. 9,269,247, Case IPR2016-00898, Apr. 13, 2017, pp. 1-31.
MTI 2008 PowerPoint, "Vanguard Program" (Exhibit 1005 of Declaration of Mike Cook), pp. 1-9.
MTI Freedom Universal 2.0 Product Manual, Dec. 2008, pp. 1-21.
Patent Owner's Preliminary Response of U.S. Pat. No. 7,737,844, Case IPR2016-01915, filed Jan. 4, 2017, pp. 1-43.
Patent Owner's Preliminary Response of U.S. Pat. No. 7,737,846, Case IPR2016-01241, Sep. 30, 2016, pp. 1-62.
Patent Owner's Preliminary Response of U.S. Pat. No. 8,884,762, Case IPR2016-00892, filed Jul. 18, 2016, pp. 1-53.
Patent Owner's Preliminary Response of U.S. Pat. No. 9,135,800, Case IPR2016-00895, Filed Jul. 18, 2016, pp. 1-62.
Patent Owner's Preliminary Response of U.S. Pat. No. 9,135,800, Case IPR2016-00896, Filed Jul. 18, 2016, pp. 1-56.
Patent Owner's Preliminary Response of U.S. Pat. No. 9,269,247, Case IPR2016-00898, Jul. 19, 2016, pp. 1-57.
Patent Owner's Preliminary Response of U.S. Pat. No. 9,396,631, Case IPR2017-00344, dated Mar. 20, 2017, pp. 1-42.
Patent Owner's Preliminary Response of U.S. Pat. No. 9,396,631, Case IPR2017-00345, dated Mar. 20, 2017, pp. 1-35.
Patent Owner's Preliminary Response, U.S. Pat. No. 9,269,247, Case IPR2016-00899, dated Jul. 19, 2016, pp. 1-54.
Patent Owner's Response of U.S. Pat. No. 8,884,762, Case IPR2016-00892, filed Jan. 18, 2017, pp. 1-42.
Patent Owner's Response of U.S. Pat. No. 7,737,844, Case IPR2016-01915, filed Jul. 12, 2017, pp. 1-38.
Patent Owner's Response of U.S. Pat. No. 9,135,800, Case IPR2016-00895, Filed Jan. 11, 2017, pp. 1-68.
Patent Owner's Response of U.S. Pat. No. 9,135,800, Case IPR2016-00896, Filed Jan. 11, 2017, pp. 1-60.
Patent Owner's Response of U.S. Pat. No. 9,269,247, Case IPR2016-00899, Jan. 18, 2017, pp. 1-46.
Petition for Inter Partes Review of Claims 1-18 of U.S. Pat. No. 7,737,846, Case IPR2016-01241, Jun. 21, 2016, pp. 1-73.
Petition for Inter Partes Review of Claims 1-19 of U.S. Pat. No. 7,737,844, Case IPR2016-01915, filed Sep. 30, 2016, pp. 1-76.
Petition for Inter Partes Review of Claims 1-27 of U.S. Pat. No. 8,884,762, Case IPR2016-00892, filed Apr. 14, 2016, pp. 1-65.
Petition for Inter Partes Review of Claims 1-29 of U.S. Pat. No. 9,396,631, Case IPR2017-00344, Nov. 29, 2016, pp. 1-65.
Petition for Inter Partes Review of Claims 1-29 of U.S. Pat. No. 9,396,631, Case IPR2017-00345, dated Nov. 29, 2016, pp. 1-63.
Petition for Inter Partes Review of Claims 1-36 of U.S. Pat. No. 9,478,110, Case IPR2017-01901, dated Jul. 31, 2017, pp. 1-71.
Petition for Inter Partes Review of Claims 1-9 and 11-36 of U.S. Pat. No. 9,478,110, Case IPR2017-01900, Jul. 31, 2017, pp. 1-68.
Petition for Inter Partes Review of Claims 25-37 of U.S. Pat. No. 9,269,247, Case IPR2016-00899, dated Apr. 14, 2016, pp. 1-65.
Propelinteractive, "Freedom Universal 2 Animation_003.wmv", YouTube Video https://www.youtube.com/watch?v=_odGNnQv0BQ&t=1s, published on Feb. 16, 2010 (see sample screenshots, pp. 1-24).
Propelinteractive, "Installing LP3 Old Version", YouTube Video <https://www.youtube.com/watch?>v=FRUaOFWiDRw&t=1s, published on Jun. 28, 2010 (see sample screenshots, pp. 1-9).
Propelinteractive, "MTI LP3 Product Mounting", YouTube Video <https://www.youtube.com/watch?>v=KX4TEuj1jCl, published on Jun. 23, 2010 (see sample screenshots, pp. 1-11).
Prosecution History for U.S. Appl. No. 12/819,944, now U.S. Pat. No. 8,698,617, filed Jun. 21, 2010.
Prosecution History for U.S. Appl. No. 12/888,107, now U.S. Pat. No. 8,698,618, filed Sep. 22, 2010.
Prosecution History for U.S. Appl. No. 13/457,348, now U.S. Pat. No. 8,558,688, filed Apr. 26, 2012.
Prosecution History for U.S. Appl. No. 14/066,606, filed Oct. 29, 2013 (now abandoned).
Prosecution History for U.S. Appl. No. 14/092,845, filed Nov. 27, 2013 (now abandoned).
Protex International Corp., "Instructions for PowerPro Detangler", 2005, 1 page.
Protex International Corp., "Instructions for PowerPro Sensor Head Cameras and Camcorders (Power and Security)", 2007, pp. 1-9.
Protex International Corp., "PowerPro System", 2006, pp. 1-2.
Reasons for Substantial New Question of Patentability Determination and Supplemental Examination Certificate, Inter Partes Review of U.S. Pat. No. 7,909,641, Case IPR2013-00122, Feb. 7, 2013, pp. 1-12, Exhibit 1019.
Retailgeek, "Virtual Tour of MTI Retail Innovation Center in 2009," YouTube Video https://www.youtube.com/watch?v=-wUvcDAmhj0, published on Aug. 2, 2010 (see transcript and sample screenshots, pp. 1-20).
Reuters, "MTI Begins Shipping Freedom™ Universal 2.0 Merchandising Solution", Oct. 1, 2008, 1 page.
Supplemental Declaration of Harry Direen, PH.D, P.E. in Support of Patent Owner's Responses for IPR2016-00892, -00895, -00896, -00898, and -00899, Inter Partes Review of U.S. Pat. No. 9,396,631, Case IPR2017-00344, Jan. 10, 2017, pp. 1-29.
U.S. Appl. No. 61/607,802, filed Mar. 7, 2012.
U.S. Appl. No. 61/620,621, filed Apr. 5, 2012.
U.S. Appl. No. 61/774,870, filed Mar. 8, 2013.
U.S. Appl. No. 61/884,098, filed Sep. 29, 2013.
Unicam Europe, "Freedom Lp3 4.17.09", SlideShare Presentation <https://www.slideshare.net/Borfu/freedom-p3-41709,> published on Jul. 28, 2009 (pp. 1-9).

* cited by examiner

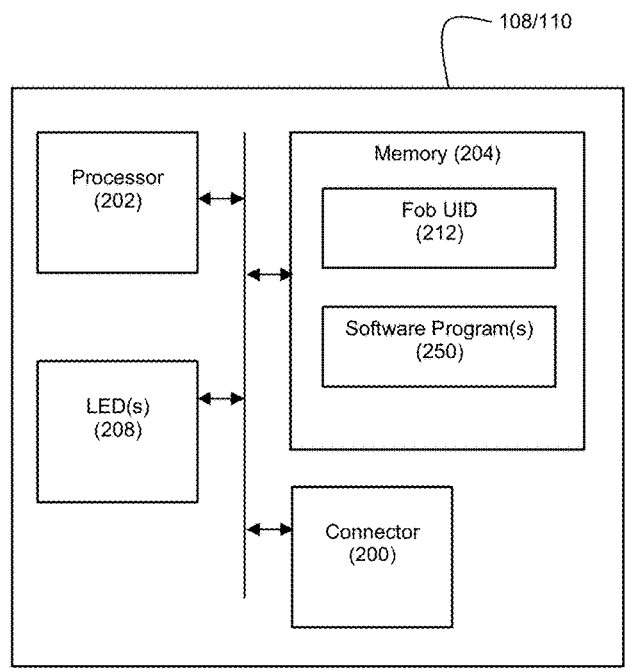
Figure 2
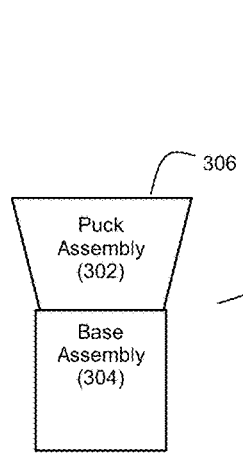
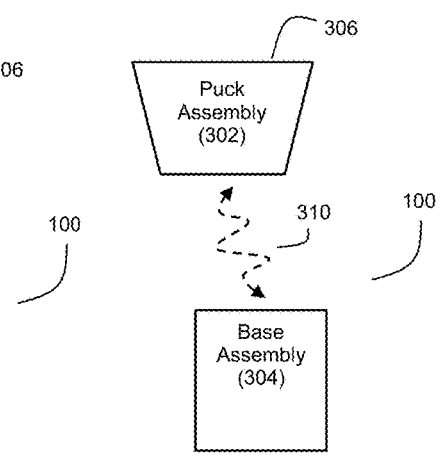
Figure 3A　　　Figure 3B　　　Figure 3C

AUTHORIZATION CONTROL FOR AN ANTI-THEFT SECURITY SYSTEM

CROSS-REFERENCE AND PRIORITY CLAIM TO RELATED PATENT APPLICATIONS

This patent application claims priority to U.S. provisional patent application Ser. No. 62/323,466, filed Apr. 15, 2016 and entitled "Security Alarm Key for Retail Security Display", the entire disclosure of which is incorporated herein by reference.

This patent application also claims priority to U.S. provisional patent application Ser. No. 62/323,511, filed Apr. 15, 2016 and entitled "Alarm Key System for Retail Security Display", the entire disclosure of which is incorporated herein by reference.

INTRODUCTION

Many products such as electronic devices (particularly hand-held electronics such as smart phones, tablet computers, digital cameras, etc.) are displayed in retail stores at individual post positions on countertop or wall-rack displays. A product display assembly at each post position is typically employed to facilitate the presentation of these products to customers. The product display assembly typically includes a puck assembly and a base assembly. A product such as an electronic device is mounted on a surface of the puck assembly, and the puck assembly engages with the base assembly when the puck assembly is at rest. To accommodate a capability for a customer to hold or take a closer look at the electronic device, the puck assembly can be lifted from its rest position. A tether may be employed to keep the puck assembly connected with the base assembly when the puck assembly is in the lift position, but this need not necessarily be the case.

Product display assemblies typically include security systems that will trigger alarms when actions such as an improper removal of the product from the puck assembly or an improper movement of the puck assembly occur. These security systems are often configured to be switchable between an armed state and a disarmed state. When in an armed state, the security system will trigger an alarm when unauthorized actions occur. When in a disarmed state, the security system is disabled.

Hand-carried keys have been developed that allow retail store personnel to arm or disarm the security systems of the product display assemblies. These keys can be referred to as "key fobs" or "security fobs". With a conventional security fob, the security fob and the product display assembly are programmed to have matching codes (an "arm/disarm" code). This programmable code effectively turns the security fob into an electronic key that fits an electronic lock on the product display assembly so that the security fob can arm or disarm the product display assembly's security system.

However, this conventional approach to security fobs results in a practical problem that relates to the turnover in personnel at a retail store. To reduce the risk of a security fob being used in an unauthorized manner, retail store managers desire an efficient mechanism for controlling which security fobs are authorized to control the security states of one or more product display assemblies. As an example, when a new employee starts employment and needs a new security fob, an efficient mechanism is desired for quickly authorizing the new security fob for use with one or more product display assemblies. As another example, when an employee discontinues employment, an efficient mechanism is desired for quickly de-authorizing the security fob(s) that had previously been used by that employee. Given the relative frequency of changes in store personnel, the need for efficient authorization and de-authorization techniques with respect to security fobs is important.

To solve these problems, disclosed herein are solutions where the system is able to quickly add a security fob to an authorization list for a product display assembly by performing a defined sequence of interactions using a first security fob and a second security fob. The first and second security fobs can be a manager security fob for use by a manager of a retail store and the new security fob that is to be added to the authorization list. As an example, the defined sequence can be a connection of the manager security fob with a connector of the product display assembly, followed by a disconnection of the manager security fob with the connector, followed a connection of the new security fob with the connector within a defined time window. The start of the time window can be triggered by the connection of the manager security fob with the connector or by the disconnection of the manager security fob from the connector. This sequence can trigger the product display assembly to update its authorization list to add an identifier for the new security fob. Thereafter, when the new security fob is connected to the product display assembly's connector, the product display assembly can authenticate the new security fob based on its identifier as compared to the authorization list. Once authenticated, the new security fob can be used to control a security status for the product display assembly. An example of a time duration that can be used for the time window can be 10 seconds.

Also disclosed herein are solutions where the system is able to quickly de-authorize one or more security fobs that may be included on the authorization list by performing another defined sequence of interactions. As example, a defined sequence for a de-authorization can be a connection of the manager security fob with a connector of the product display assembly, followed by a disconnection of the manager security fob with the connector, followed a re-connection of the manager security fob with the connector within a defined window. This sequence can trigger the product display assembly to delete its authorization list which will thereby de-authorize any previously authorized security fobs.

These and other features and advantages of the present invention will be described hereinafter to those having ordinary skill in the art.

BRIEF DESCRIPTION OF THE DRAWINGS

FIG. 2 shows an example embodiment of a security fob.

FIGS. 3A-F show example embodiments of a product display assembly.

DETAILED DESCRIPTION OF EXAMPLE EMBODIMENTS

Figure 1:
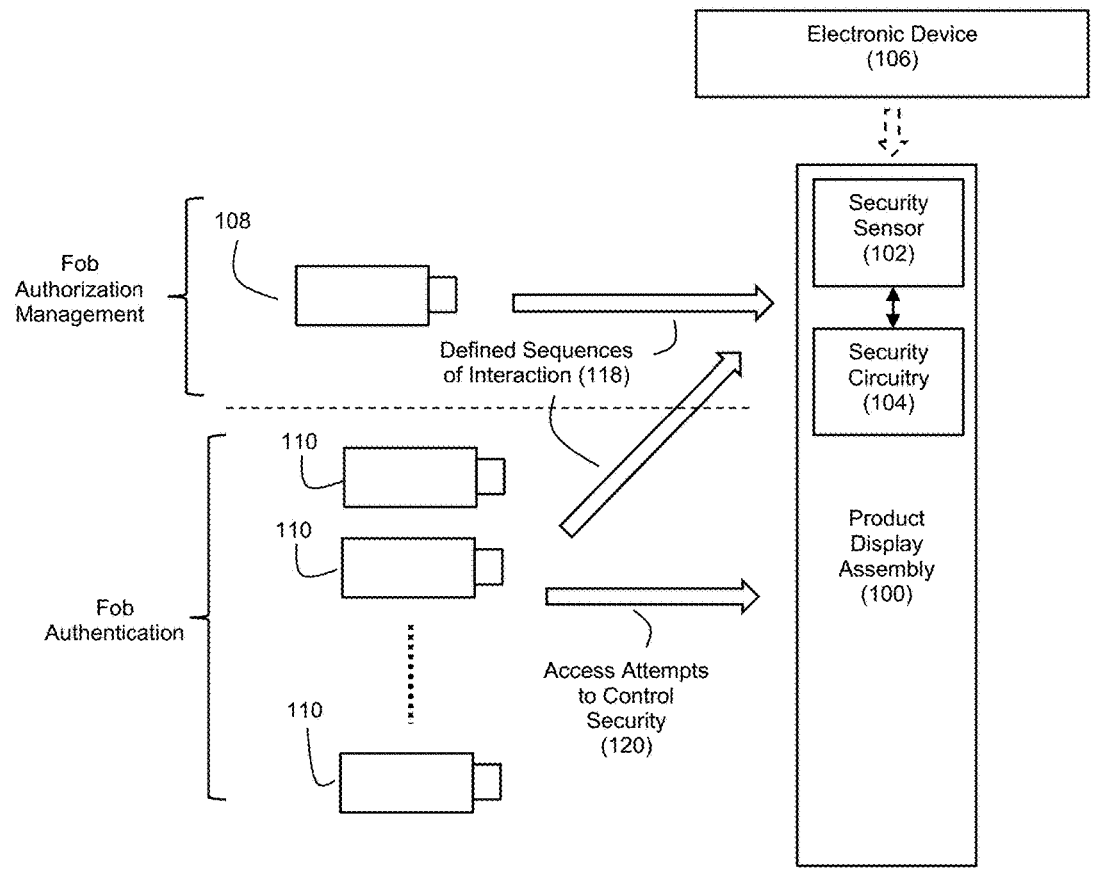
FIG. 1 discloses an example embodiment of a gateway-based authorization system for security fobs.

FIG. 1 discloses an example embodiment of a system for securely managing how security fobs are authorized and de-authorized with respect to control over security functions of a product display assembly. The system can include a product display assembly 100 for cooperation with one or more manager (or master) security fobs 108 and one or more user security fobs 110.

The product display assembly 100 can serve as an anti-theft security system, and it can be used for presenting a product such as an electronic device 106 to consumers in a secure manner. As mentioned, examples of suitable electronic devices 106 can include hand-held consumer electronics such as smart phones, tablet computers, digital cameras, etc. The product display assembly 100 can include a security sensor 102 and security circuitry 104 that cooperate with each other to generate a security condition signal in response to detecting an event relating to a removal of the electronic device 106 from the product display assembly 100. The security circuitry 104 is controllable to be switchable between an armed state and a disarmed state based on interaction with an authorized security fob 110.

To enable the authorized use of a security fob 110 with the product display assembly 100, a manager security fob 108 and a user security fob 110 interact with the product display assembly 100 according to a defined sequence 118 that will trigger a fob authorization management action by the product display assembly 100. For example, a sequence of interactions can be defined that causes the product display assembly 100 to enter a mode that adds a new security fob 110 to a list of one or more security fobs that are authorized for controlling a security status for the product display assembly. Once a security fob 110 has been added to this authorization list using techniques as described below, that security fob can interact with the product display assembly 100 (interactions 120) so that the security fob 110 can be authenticated, whereupon the authenticated security fob 110 can control one or more security functions.

In this fashion, managers of a retail store can manage which security fobs are authorized to control security functions for which product display assemblies in a simple and effective manner.

FIG. 2 shows an example embodiment of a security fob 108 or 110. The security fob 108/110 can take the form of a hand-held object that is capable of communicating with a product display assembly 100. The security fob 108/110 can exhibit any of a number of shapes as would be understood by a practitioner. For example, the security fob 108/110 can be shaped in a manner similar to small hand-held thumb drives and the like. As another example, the security fob 108/110 can be shaped in a manner similar to a disk, a cylinder, or keyless entry devices for vehicles. In still other example embodiments, the security fob 108/110 can take the form of a badge or card or even a wireless computing device such as a smart phone or tablet computer (examples of which are discussed below).

The security fob 108/110 can include an interface 200, processor 202, memory 204, and one or more lights 208 such as one or more light emitting diodes (LEDs), each enclosed or partially enclosed within a housing of some fashion such as a plastic or composite shell. These components can be configured to communicate with each other over a bus or similar interconnection. Furthermore, it should be understood that the security fob 108/110 need not necessarily include all of the components shown in FIG. 2; for example, a practitioner may choose to employ a security fob that does not include any light(s) 208. Likewise, it should also be understood that the security fob 110 may include additional components not shown in FIG. 2 (e.g., a wireless I/O for wireless communications over a wireless network with remote systems; a power storage device such as a battery and/or one or more capacitors; and/or user input devices such as one or more buttons, etc.).

Through interface 200, the security fob 108/110 can communicate with the product display assembly 100. As an example, the interface 200 can be a physical connector for detachably connecting the security fob 108/110 with the product display assembly 100. As another example, the interface 200 can be a wireless connector for wirelessly connecting the security fob 108/110 with the product display assembly. The interface 200 can be any type of interface suitable for interfacing the security fob 108/110 with a complementary interface of the product display assembly 100 for the purposes described herein. For example, in embodiments where the interface 200 is a physical connector, this physical connector can be a physical connector that is compliant with a standard such the Universal Serial Bus (USB) standard (e.g., a mini-USB connector).

The processor 202 and memory 204 can be any hardware devices suitable for performing the operations described herein. As an example, the processor 202 can take the form of an Atmel SAMD21 microprocessor. The memory 204 can be integral to processor 202 and/or external to the processor 204.

The memory 204 can store an identifier 212 for the security fob 108/110. This identifier 212 is preferably a unique identifier (UID) that distinguishes the subject security fob 108/110 from other security fobs 108/110 within the system. This uniqueness can be uniqueness across a system such as within a given retail store or it can be uniqueness across a wider system (e.g., a chain of retail stores). At its widest extent, the uniqueness can be universal, in which case the UID can take the form of a universal UID (UUID). An example UUID code can be a multi-bit code (e.g., a 128-bit code), with a certain number (or set) of bits allocated to identify the manufacturer, another set of bits allocated to other information (for example, the time or date that the UUID code was burned onto the memory chip), and a third set of bits allocated for expressing a uniquely generated random number. Accordingly, the fob UUID 212 operates like a unique serial number and specifically identifies only one security fob 108/110. In an example embodiment, this fob UUID 212 is not re-programmable.

The memory 204 can also store one or more software programs 250 for execution by processor 202. The software program(s) 250 can take the form of a plurality of processor-executable instructions that are resident on a non-transitory computer-readable storage medium such as memory 204. An example embodiment of software program(s) 250 is described below with reference to FIG. 5.

The light(s) 208 can take the form of any light source suitable for performing the operations described herein. As an example, the light(s) 208 can be a single LED that becomes illuminated whenever the security fob 110 successfully controls the security status of the security circuitry 104. As another example, the light(s) 208 can be multiple LEDs (which may be LEDs of different colors) that will be used to indicate to a user whether the security fob has been successfully added as an authorized security fob (an illumination of a first LED) and to indicate a successful controlling action with respect to the security circuitry 104 (an illumination of a second LED). It should be understood that other combinations are possible to indicate different events if desired by a practitioner.

Manager security fobs 108 and user security fobs 110 can exhibit the same basic architecture as each other, as indicated by FIG. 2. Any of a number of techniques can be employed to render manager fobs 108 distinguishable from user fobs 110 by a reader system employed to manage the authorization list. For example, the fob identifier 212 of a manager fob 108 can be known to a reader system. In an example embodiment, the reader system can be part of the security circuitry 104. Accordingly, with such an example embodiment, the security circuitry 104 would be able to identify manager fobs 108 by reading their fob identifiers 212. However, in other example embodiments, data flags other than fob identifier might be used to indicate status as a manager fob 108 (e.g., a single bit flag that would be high if the subject fob is a manager fob 108 and low if the subject fob is a user fob 110). Still further, with other example embodiments, some form of hard-wired encoding can be used by a fob to identify its status as a manager fob 108. For example, one or more configuration resistors can be used to identify which fobs are manager security fobs 108 and which are user security fobs 110. With the configuration resistors, the amount of resistance can be sensed by a reader and used to determine fob type. For example, resistance corresponding to X Ohms can be associated with a manager security fob 108 and resistance corresponding to Y Ohms can be associated with a user security fob 110.

FIGS. 3A-C show various example embodiments of different types of product display assemblies 100 that can be used with the system. As noted above, the product display assembly 100 can include a puck assembly 302 and a base assembly 304. Electronic device 106 can be mounted on surface 306 of the puck assembly 302 so that the electronic device 106 can be securely displayed to customers in a store. The puck assembly 302 is moveable between a rest position and a lift position. When in the rest position, the puck assembly 302 contacts the base assembly 304, as shown in FIG. 3A. When in the lift position, the puck assembly 302 separates from the base assembly 304, as shown by FIGS. 3B and 3C. FIG. 3B shows an example embodiment where a tether assembly 308 is used to physically connect the puck assembly 302 with the base assembly 304, even when the puck assembly 302 is in the lift position. A security condition signal (e.g., to indicate an unauthorized removal of electronic device 106 from the puck assembly 302) can be communicated from the puck assembly 302 via the tether assembly 308 or via wireless communication (with the base assembly 304 or with some other system). FIG. 3C shows an example embodiment of a tetherless product display assembly 100. With the example of FIG. 3C, wireless communication 310 can be used to communicate a security condition signal from the puck assembly 302 to the base assembly 304 (or to some other system).

Examples of product display assemblies 100 that can be adapted for use in the practice of the embodiments described herein are disclosed in U.S. Pat. Nos. 8,558,688, 8,698,617, and 8,698,618 and U.S. Patent Application Publication Nos. 2014/0159898 and 2017/0032636, the entire disclosures of each of which are incorporated herein by reference.

Figure 3D:
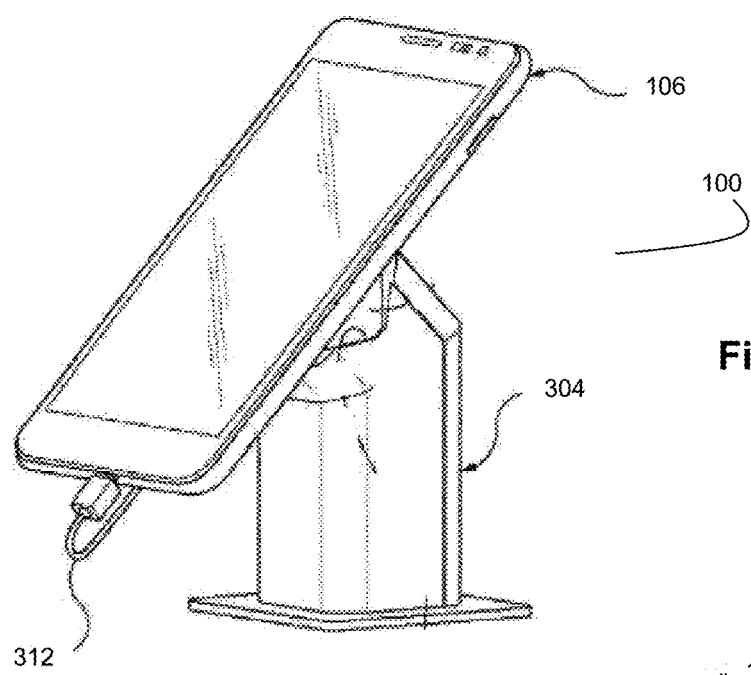
Figure 3E:
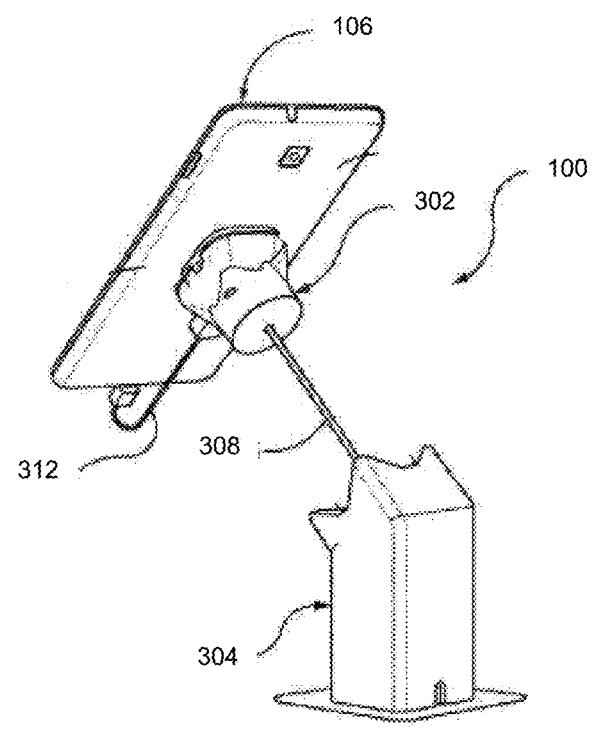

For example, FIGS. 3D and 3E reproduce FIGS. 27 and 28 from incorporated U.S. Patent Application Publication No. 2017/0032636 and show an example product display assembly 100 that is further described in the 2017/0032636 publication. The product display assembly 100 shown by FIGS. 3D and 3E include a puck assembly 302, a base assembly 304, and a tether assembly 308. A power cable 312 provides an electrical connection between the puck assembly 302 and the electronic device 106 through which the electronic device 106 can be charged. The puck assembly 302 can receive power from a power source via the base assembly 304 when the puck assembly is at rest, as shown in FIG. 3D. Contacts included on the puck assembly and base assembly (see, e.g., contact 314 shown by FIG. 3E) can contact each other when the puck assembly is at rest, thereby forming an electrical connection through which power can be delivered from a power source (not shown) to the puck assembly via the base assembly and the electrical connection formed by the contacts. When the puck assembly 302 is lifted, the contacts lose contact with each other, thereby breaking the electrical connection. Optionally, a battery or other power storage device can be included in the puck assembly 302 to store power for use by the puck assembly 302 when the puck assembly is in the lift position.

Figure 3F:
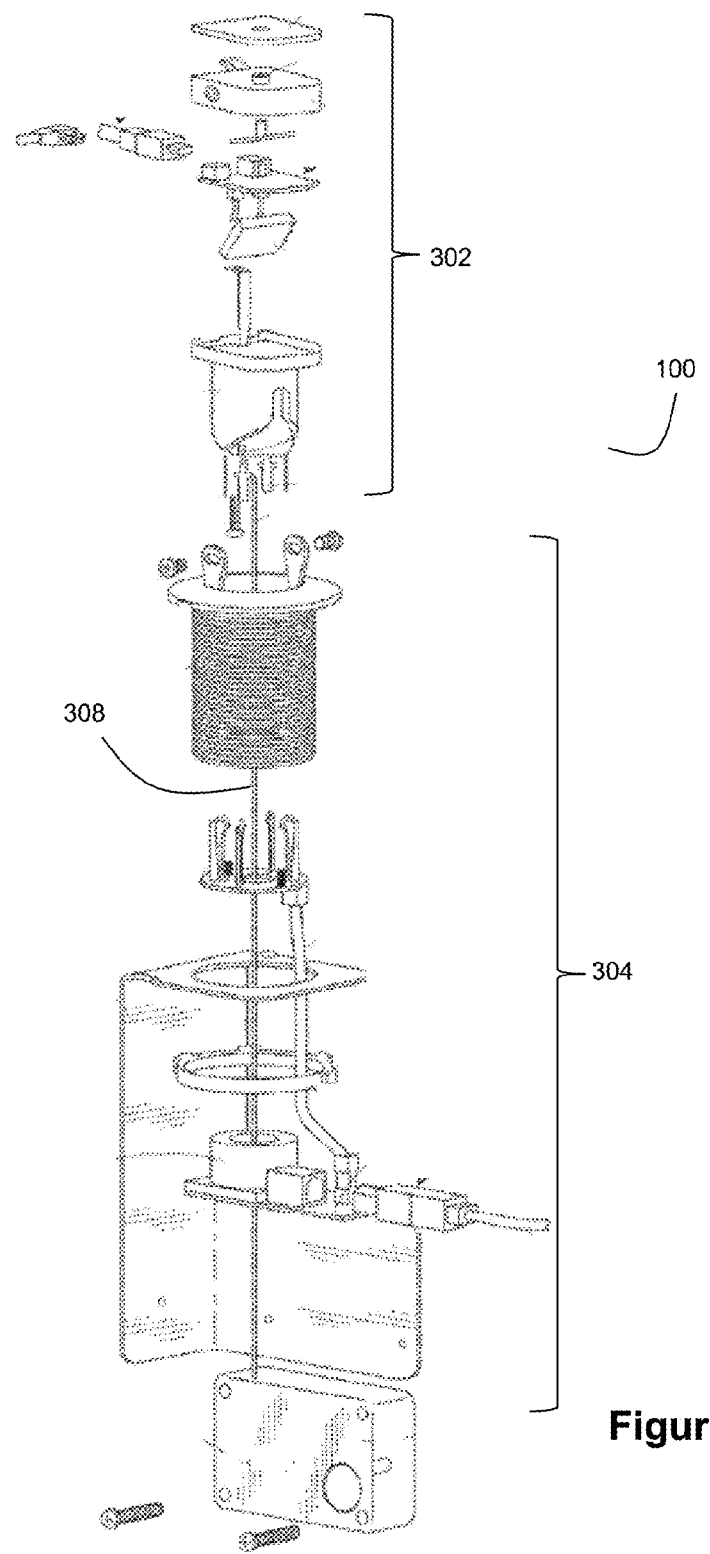
Figure 8:
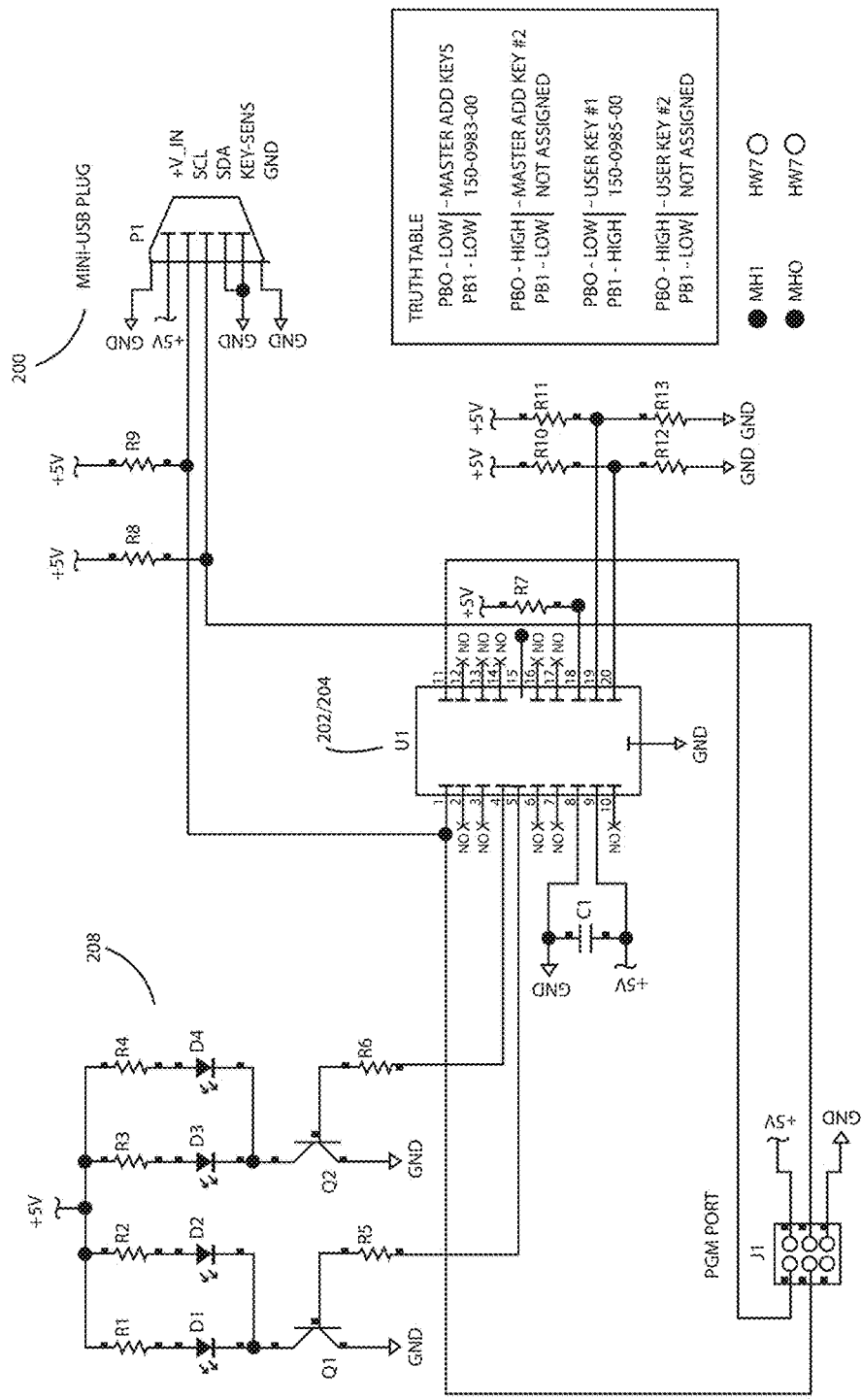
FIG. 8 depicts another example embodiment of a security fob.

As another example, FIG. 3F reproduces FIG. 8 from incorporated U.S. Pat. No. 8,698,617 and shows an example product display assembly 100 that is further described in the '617 patent. In this view, an example product display assembly 100 is shown in an exploded manner where various components of a puck assembly 302, a base assembly 304, and a tether assembly 308 can be seen.

Figure 3G:
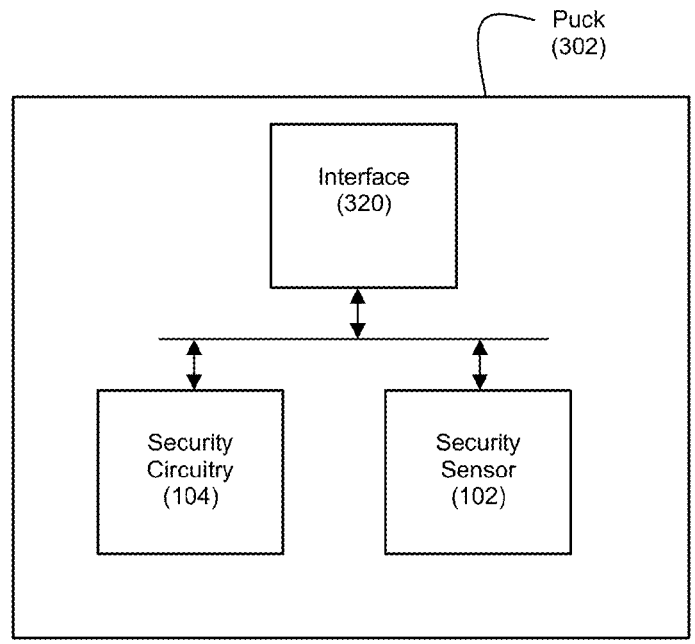
FIGS. 3G-H show example embodiments of a puck assembly.

FIG. 3G depicts an example puck assembly 302 that includes an interface 320, security sensor 102, and security circuitry 104. These components can each be enclosed or partially enclosed within a housing of some fashion such as a plastic or composite shell. These components can also be configured to communicate with each other over a bus or similar interconnection.

Interface 320 is for interfacing a security fob 108/110 with the puck assembly 302. Interface 320 can be an interface type that is complementary with the interface 200 of the security fob 108/110. For example, if the interface 200 is mini-USB connector, then interface 320 can be a complementary mini-USB connector. As another example, if the interface 200 is an RFID chip, the interface 320 can be an RFID reader.

The security sensor 102 can be one or more sensors that are adapted to detect events such as a removal of the electronic device 106 from the puck assembly 302 or other events that may indicate a possible security condition. An example security sensor 102 can be a pressure button included on the puck assembly surface 306 that is depressed when the electronic device 106 is engaged with the puck assembly 302 but is released when the electronic device 106 is removed from the puck assembly 302. A release of the pressure button can trigger the security circuitry 104 (when armed) to generate a security conditional signal. However, it should be understood that other security sensors 102 could be employed. Another example of a security sensor 102 that can be used with product display assemblies 100 that include a tether assembly 308 can be a circuit that detects when the tether is cut or otherwise broken. Still another example of a security sensor 102 can be a position detection circuit that detects when the puck assembly 302 moves a certain distance beyond the base assembly or leaves a designated virtual fence area. For example, such a position detection circuit can rely on wireless signals and signal strength estimations to detect distances between the puck assembly 302 and base assembly 304. Still additional examples of security sensors 102 can include power draw sensors, contact closures, optical sensors for detecting objects (or the absence of objects), vibration sensors, and/or acceleration sensors.

The security circuitry 104 can be any circuitry that is configured to be (1) controllable between a plurality of security states in response to the security code 116 and (2) generate a security condition signal when appropriate (e.g., when the security circuitry 104 is in an armed state and the security sensor 102 detects a triggering event). For example, the security circuitry 104 can include switching logic and the like that is controlled based on a signal from a control processor that controls the switching logic based on whether the security code 116 has been verified. The security circuitry 104 may also include circuitry such as relay drivers, motor controls, alarming units, solenoid drivers, and/or lock actuators.

Figure 3H:
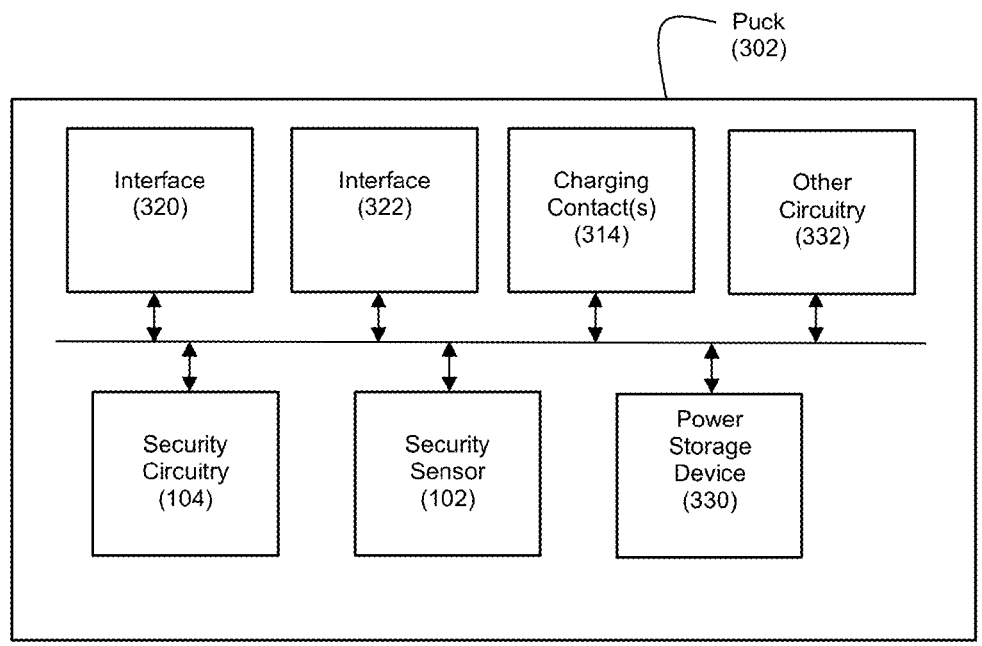
Figure 3I:
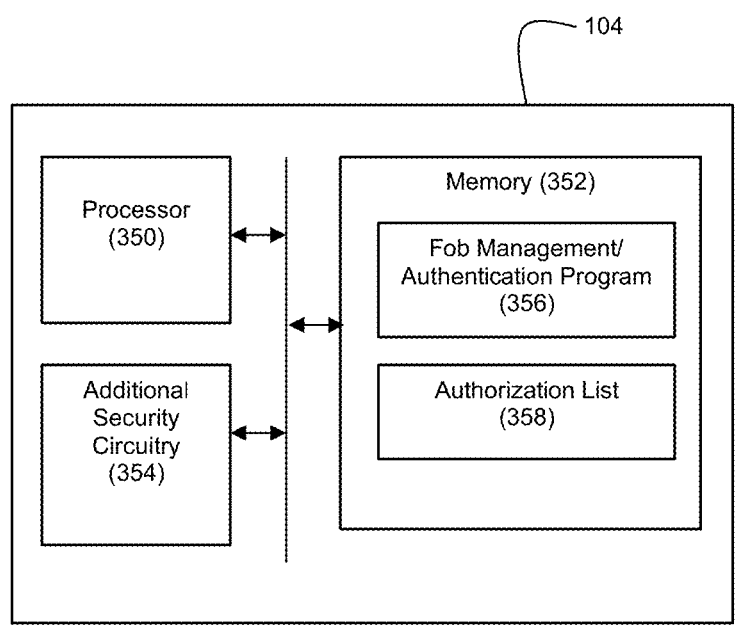
FIG. 3I shows an example embodiment of security circuitry for a product display assembly.

As shown by FIG. 3I, security circuitry 104 can include a processor 350 and memory 352 that cooperate with each other to execute one or more software programs 356 that provide fob management and authentication functions. The software program 356 can take the form of a plurality of processor-executable instructions that are resident on a non-transitory computer-readable storage medium such as memory 352. An example of such a software program 356 is described below with reference to FIG. 4. The processor 350 and memory 352 can be any hardware devices suitable for performing the operations described herein. As an example, the processor 352 can take the form of an Atmel SAMD21 microprocessor. The memory 352 can be integral to processor 350 and/or external to the processor 350.

The memory 352 can store the fob management/authentication program 356 as well as the authorization list 358 used by program 356 when determining whether a security fob 110 is an authorized security fob. The authorization list 358 can take the form of a list of one or more fob identifiers 212 for security fobs 110 that are authorized to control the security status for the product display assembly 100.

The security circuitry 104 can also include additional circuitry 354 relating to the security functions provided by the security circuitry, examples of which are shown by FIGS. 9-10 and 12-14.

It should be understood that the puck assembly 302 can include components different than those shown in FIG. 3G. For example, FIG. 3H shows an example puck assembly 302 that includes additional components. The puck assembly 302 of FIG. 3H includes an additional interface 322. This interface 322 can interface the puck assembly 302 with an electronic device 106 presented to customers via the product display assembly 100. For example, the interface 322 can be a physical connector adapted for detachable connection with a power cable for providing power to the electronic device 106. Examples of such power cables are described in the above-referenced and incorporated U.S. Pat. Nos. 8,558,688, 8,698,617, and 8,698,618 and U.S. Patent Application Publication Nos. 2014/0159898 and 2017/003263.

The puck assembly 302 of FIG. 3H also includes one or more charging contacts 314. These charging contacts 314 can create an electrical connection with a power source via complementary contacts of the base assembly 304 when the puck assembly 302 is in the rest position. Examples of such charging contacts 314 are described in the above-referenced and incorporated U.S. Pat. Nos. 8,558,688, 8,698,617, and 8,698,618 and U.S. Patent Application Publication Nos. 2014/0159898 and 2017/003263.

The puck assembly 302 of FIG. 3H also includes a power storage device 330 that is charged via electricity received through the charging contacts 314 when the puck assembly 302 is in the rest position and that stores power for use by the puck assembly 302 when the puck assembly is in the lift position. The power storage device 330 can take the form of a battery (preferably a rechargeable battery) or a suitable capacitor. Examples of such a power storage device 330 are described in the above-referenced and incorporated U.S. Pat. Nos. 8,558,688, 8,698,617, and 8,698,618 and U.S. Patent Application Publication Nos. 2014/0159898 and 2017/003263.

The puck assembly 302 of FIG. 3H can also include additional circuitry 332. For example, the additional circuitry 332 can include circuitry for distributing power from the charging contacts 314 to other components of the puck assembly 302 (e.g., the security circuitry 104, interfaces 320 and 322, power storage device 330, etc.) and/or circuitry for distributing power from the power storage device 330 to other components of the puck assembly 302 (e.g., the security circuitry 104; interfaces 320 and 322). As another example, the additional circuitry 332 can include wireless communication circuitry that provides the puck assembly with an ability to wirelessly transmit security condition signals from the security circuitry 104 or otherwise wirelessly communicate with remote systems. Examples of additional circuitry 332 are described in the above-referenced and incorporated U.S. Pat. Nos. 8,558,688, 8,698,617, and 8,698,618 and U.S. Patent Application Publication Nos. 2014/0159898 and 2017/003263.

Figure 4:
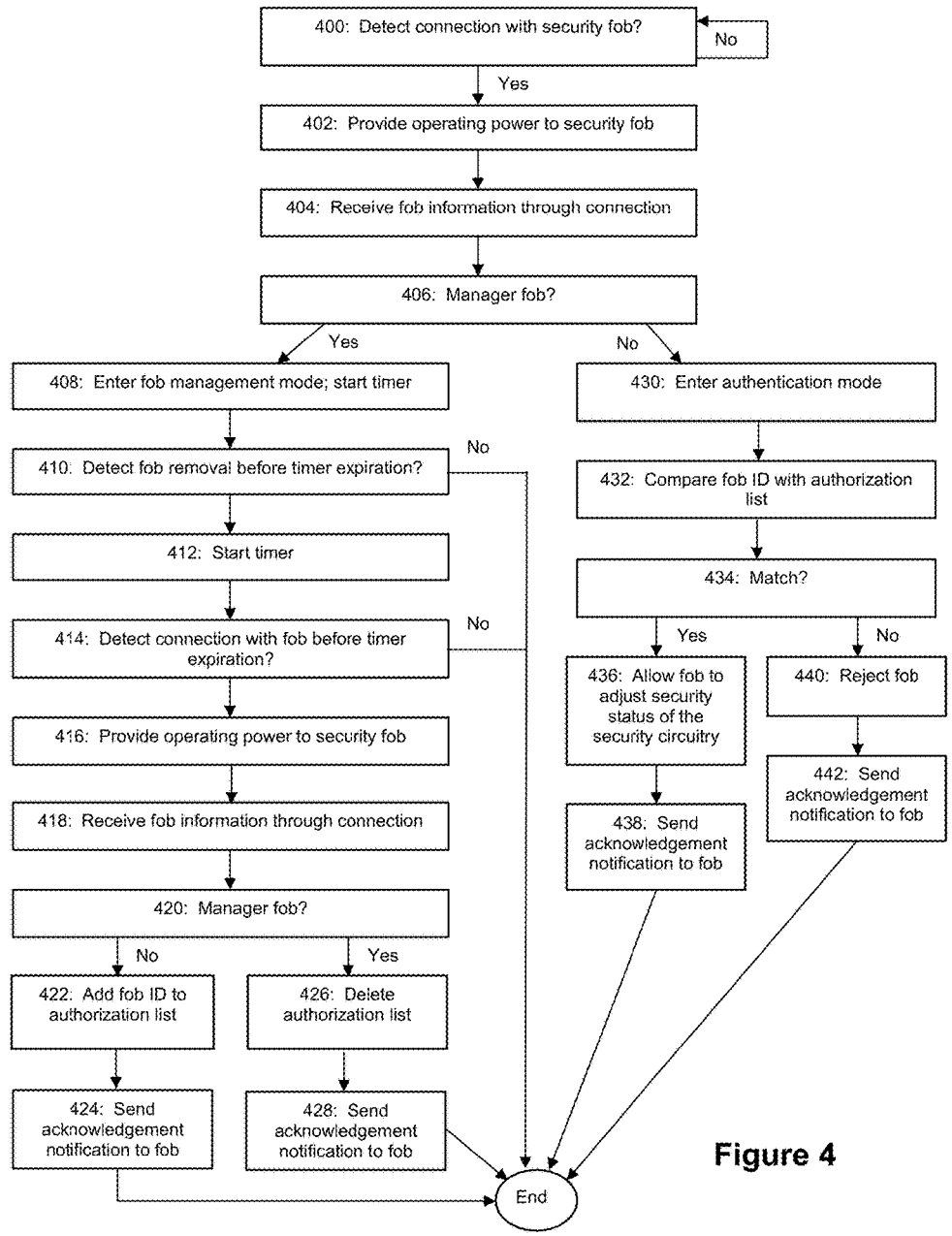
FIG. 4 shows an example process flow for execution by security circuitry to facilitate fob authorization management and authentication.

FIG. 4 depicts an example process flow for security circuitry 104 that includes execution of software program 356 by processor 350 to facilitate the management of which security fobs 110 are authorized and how the authorized security fobs are authenticated. At step 400, the security circuitry 104 detects a connection with a security fob at interface 320. This connection can be a physical connection or a wireless connection depending upon the desires of a practitioner. This detection can be performed in any of a number of ways. For example, in an example embodiment where the connection between interfaces 200 and 320 is a physical connection, a configuration resistor in the security fob can be detected by the security circuitry 104 to identify the connected device as a security fob. Different types of devices that may be connected via interface 320 can include different values for configuration resistors to thereby allow for the security circuitry 104 to distinguish between different types of connected devices. Thus, the configuration resistors can not only be used to distinguish manager security fobs 108 from user security fobs 110, but they can also be used to distinguish between different types of devices (e.g., security fobs versus electronic devices 106). The distinction between different types of fobs (e.g., manager fobs versus user fobs) can also be communicated digitally as part of an UID message. After detecting the connected security fob, the security circuitry 104 can provide operating power to the security fob through the connection. At this point, the security circuitry receives information about the connected security fob through the connection (step 404). For example, this fob information can include the connected security fob's fob identifier 212 and/or any other information about the connected security fob that is needed as part of the management/authentication process. If the security fob provides this information in an encrypted format in order to enhance security, it should be understood that step 404 can include a corresponding decryption operation.

At step 406, the processor 350 determines whether the connected security fob is a manager security fob 108. This determination can be made based on the fob information received at step 404. As mentioned above, this determination can be accomplished in any of a number of ways. For example, the memory 352 can store the fob identifier(s) of all manager security fobs 108. Then, at step 408, the processor can compare the fob identifier 212 received at step 404 with the known fob identifier(s) for manager security fob(s) 108. If there is a match, then step 406 can result in a determination that the connected security fob is a manager security fob 108. As another example, the processor 350 can check whether a manager flag bit or the like is set within the connected security fob (this bit value can be communicated to the processor 350 as part of the fob information received at step 404). As still another example, some other hardwired-encoding used by the connected security fob such as configuration resistors can be detected via the connection between 200 and 320 to flag the connected fob as a manager security fob 108. If the connected fob is a manager security fob 108, then the process flow can proceed to step 408 where the program 356 enters a fob management mode. If the connected fob is not a manager security fob, then the process flow can proceed to step 430 where the program 356 enters an authentication mode.

When the process flow enters the fob management mode, the processor 350 starts a timer (step 408). This timer defines a first time window during which the connected manager fob 108 must be removed in order to enable the addition of a new security fob 110 to the authorization list 358. At step 410, the processor detects whether the connected manager security fob 108 has been disconnected before the expiration of the first time window. If not, the process flow can terminate. If so, the process flow can proceed to step 412. The first time window can have any duration deemed suitable by a practitioner for the purposes of the fob management process. For example, a duration that falls within a range of around 5 seconds to around 30 seconds could be used (e.g., a time window of 10 seconds). As an example, for physical connections, a disconnection may be performed by removing the manager fob 108 from interface 320. As another example, for wireless connections, a disconnection may be performed by moving the manager fob 108 outside a wireless connection range of interface 320.

At step 412, the processor 350 starts a timer again. This timer defines a second time window during which one or more defined events with one or more fobs must occur in order to accomplish a desired management task. The duration for this second time window can be the same duration as the first time window if desired by a practitioner (e.g., 10 seconds), although this need not be the case.

At this point, the process flow awaits a new connection of a security fob with interface 320. At step 414, the processor determines whether a connection has been made with a security fob before the expiration of the second time window. The detection of a connected fob can be performed as described above in connection with step 400. Upon detecting such a connection, the processor 350 can determine whether the second time window has expired. If the connection occurred after the expiration of the second time window, the process flow can terminate. Otherwise, the process flow can continue to step 416 where operating power is provided to the connected security fob (see step 402 above). Next, at step 418, fob information is received from the connected security fob as at step 404, and at step 420 a determination is made as to whether the connected fob is a manager security fob 108 as at step 406.

If the security fob connected at step 414 before the expiration of the second time window is not a manager security fob, the processor adds this security fob to the authorization list at step 422. To do so, the processor can write the fob identifier 212 received at step 418 from the connected security fob 110 to the authorization list 358. Thereafter, the processor 350 can send an acknowledgement notification to the connected security fob 110 via interface 320 that serves as a message to inform the connected fob 110 that it has been successfully added to the authorization list 358.

If the security fob connected at step 414 before the expiration of the second time window is a manager security fob, the processor deletes the authorization list 358 at step 426. To do so, the processor can remove all of the fob identifiers 212 that may be present on the list 358. Thereafter, the processor 350 can send an acknowledgement notification to the connected manager fob 108 via interface 320 that serves as a message to inform the connected fob 108 that it has been successfully deleted the authorization list 358.

Accordingly, it should be understood that steps 400-428 define two sequences for different modes of fob management after an initial removal of a manager security fob 108. To authorize a new security fob 110, a manager can connect the security fob 110 to be authorized to interface 320 during a defined time window after the initial removal of the manager fob 108. This roughly corresponds to a sequence of connecting and disconnecting a manager fob 108 followed by connecting a security fob 110 that is to be added to the authorization list 358 within a defined time window after disconnection of the manager fob 108. To de-authorize all currently authorized security fobs 110, a manager can re-connect the manager fob 108 during a defined time window after the initial removal of the manager fob 108. This roughly corresponds to a sequence of connecting and disconnecting a manager fob 108 followed by re-connecting the manager fob 108 within a defined time window after the initial disconnection of the manager fob 108 (and without an intervening connection with a security fob 110).

While FIG. 4 shows an example of two sequences for two fob management tasks, it should be understood that different sequences and/or additional fob management tasks could be employed. For example, a third fob management task could be a de-authorization of a specific security fob 110 rather than de-authorization of all security fobs 110. Such a fob management task can be useful in a scenario where the manager has possession of the authorized security fob 110 that is to be de-authorized. To enable such a third management task, an additional sequence can be encoded by the management process flow such as by having the "delete all" management task being triggered by a triple connection sequence of the manager security fob 108 where a sequence of connect/disconnect the manager fob 108 is followed by another sequence of connect/disconnect for the manager fob 108 (within a defined time window without an intervening connection of a security fob 110) and then followed by another re-connection of the manager fob 108 during a defined time window. Such a pattern could then trigger deletion of the authorization list 358. Then, the double connection sequence of the manager security fob 108 can be used to trigger an option for a manger to only de-authorize a specific security fob 110 by then connecting that specific security fob 110 within a defined window after disconnection of the manager fob 108. This specific de-authorization sequence would thus be a sequence of connect/disconnect the manager fob 108, followed by another sequence of connect/disconnect for the manager fob 108 (within a defined time window without an intervening connection of a security fob 110) and then followed by a connection during a defined time window of the specific security fob 110 to be de-authorized.

When the process flow enters the fob authentication mode at step 430, the processor 352 compares the fob identifier 212 received at step 404 with the fob identifiers from the authorization list 358 (step 432). If the received fob identifier 212 matches any of the fob identifiers on the authorization list 358 as determined at step 434, the processor 350 can conclude that the connected security fob 110 is authorized and proceed to step 436. If the received fob identifier 212 does not match any of the fob identifiers on the authorization list 358 as determined at step 434, the processor 350 can conclude that the connected security fob 110 is unauthorized and proceed to step 440.

At step 436, the processor 350 allows the connected and authenticated security fob 110 to adjust the security status of the security circuitry 104. For example, if the security fob 110 is designed to toggle the security circuitry 104 between an armed state and a disarmed state after authentication, the processor 350 can correspondingly toggle the security state of the security circuitry 104 at step 436. If the security fob 110 is designed to provide additional layers of control (e.g., a user-defined security function such as an arm command, a disarm command, and/or an alarm clear command that could be defined in response to user input via a button of the security fob 110), step 436 can implement a defined command received from the connected security fob 110 through interface 320.

Thereafter, the processor 350 can send an acknowledgement notification to the connected security fob 110 via interface 320 that serves as a message to inform the connected fob 110 that it the security status of the security circuitry has been successfully controlled (step 438).

At step 440, the processor 450 rejects the connected security fob for failure of authentication. This can be followed by step 442 where the processor 350 sends an acknowledgement notification to the connected security fob 110 via interface 320 that serves as a message to inform the connected fob 110 that it has not been authenticated.

Accordingly, it can be seen that the process flow of FIG. 4 provides managers of retail stores with an efficient and easy-to-use technique for defining which security fobs 110 are authorized and which security fobs are not authorized to control the security functions of a given product display assembly 100.

It should be understood that FIG. 4 is merely an example of a process flow for execution in connection with software program 356, and a practitioner may employ alternate process flows. For example, a practitioner may choose to omit one or more of the steps relating to the acknowledgement notification messages if desired. Also, rather than ending the process flow after performance of steps 422 and 424, the process flow could also be augmented to allow a manager to add another security fob 110 to the authorization list while the process flow is in the "fob management" mode. For example, after performing step 422 and/or 424, the processor could re-start the timer to allow time for a manager to connect another security fob 110 that is to be added to the authorization list 158. This re-setting of the timer can be repeated as additional security fobs 110 are connected and added to the authorization list 358.

Figure 5:
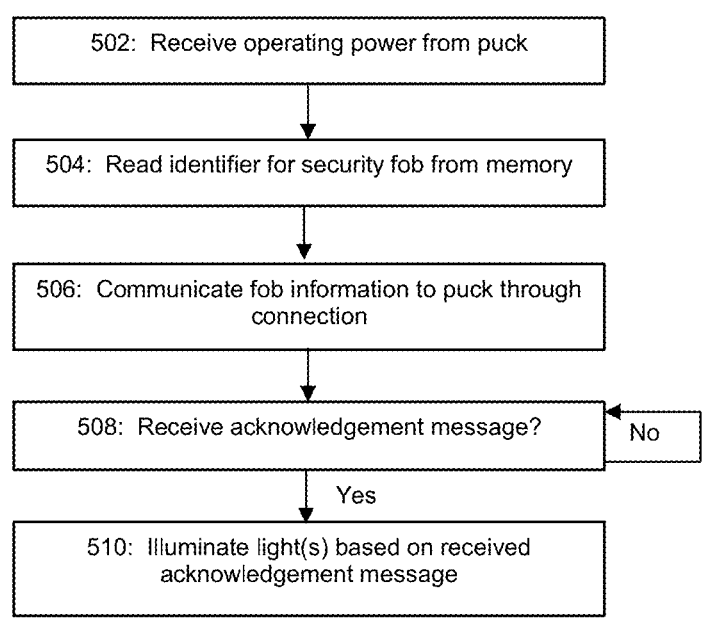
FIG. 5 shows an example process flow execution by a security fob when interacting with the security circuitry.

FIG. 5 depicts an example process flow for software program 250 for execution by the processor 202 of a security fob 108/110 to facilitate the management/authentication tasks as described herein. The process flow of FIG. 5 begins when the security fob 108/110 interfaces with a puck assembly 302 via interfaces 200 and 320. If there is a connection between interfaces 200 and 320, the security fob 108/110 receives operating power from the puck assembly 302 via the connection (step 502). For example, in an example instance of a physical connection, the security fob 108/110 can draw current from the puck assembly 302 via the physical connection. Using such operating power, the processor 202 can wake up and execute software program 250. The security fob 108/110 can also be designed to have enough onboard capacitance to enable it to remained powered up during a sleep state for a desired amount of time (e.g., around 2 seconds).

After being powered up and starting execution of program 250, the processor reads the fob identifier 212 from memory 204 (step 504). At step 506, the processor communicates this fob identifier 212 (and any other desired information) to the puck assembly 302 via the connection between the puck assembly 302 and the security fob 108/110 (e.g., via the connection between interfaces 200 and 320). To further enhance the security of the system, the communication at step 506 can be an encrypted communication, and this encrypted communication employ a time-varying encryption. For example, the processor 202 can employ an encryption technique such as an encrypted I$^2$C serial protocol for the communication between the security fob 108/110 and the puck assembly 302 at step 516. Further still, for a practitioner that may operate multiple stores, different encryption can be performed for different store locations (e.g., different encryption keys, different modes of encryption (e.g., electronic code book (ECB), cipher block chaining (CBC), etc.), and/or different types of encryption (e.g., AES, Triple DES, etc.).

At step 508, the processor 202 awaits receipt of an acknowledgement notification message from the puck. After receiving and interpreting such a message, the processor can illuminate one or more lights 208 based on the message so as to notify the manager or other user as to whether a desired task was performed (step 510). For example, various light encoding schemes can be used to communicate the completion of different tasks (such as a first color light being illuminated if the subject fob 110 was successfully authenticated, a second color light being illuminated if the subject fog 110 was successfully added to the authorization list, etc.).

Figure 6:
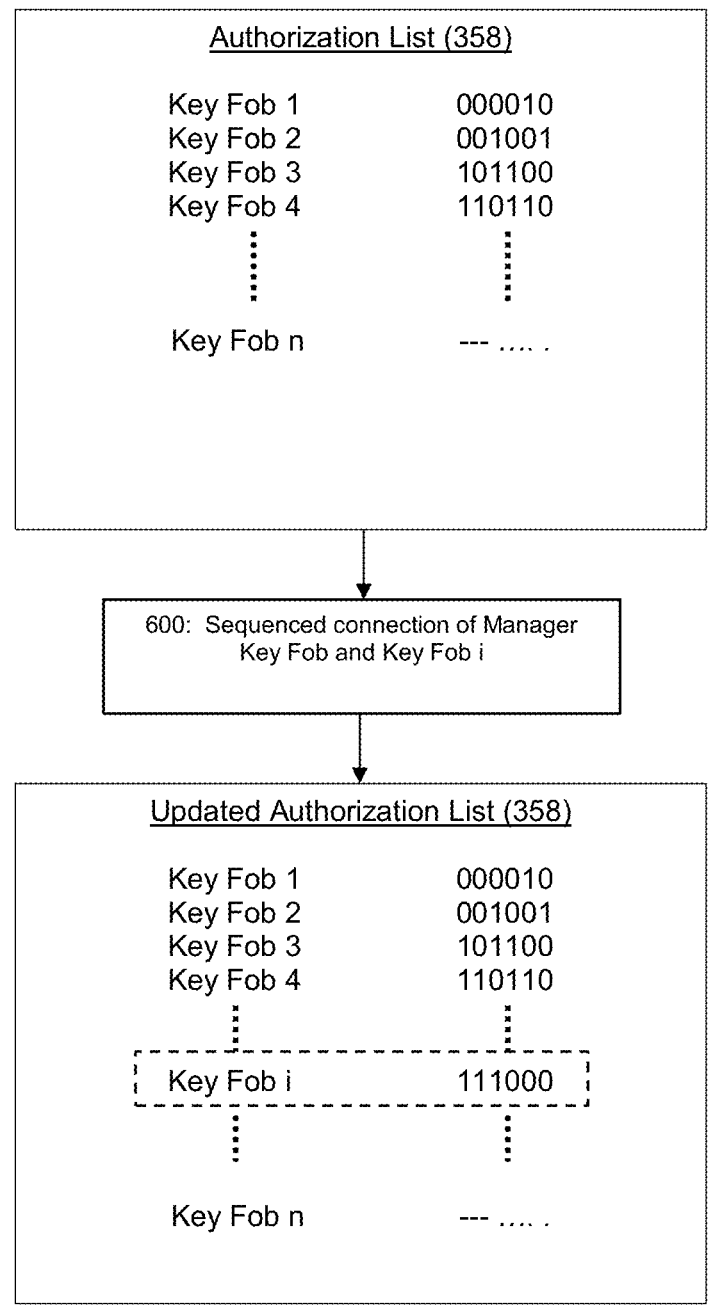
FIG. 6 depicts an example of how an authorization list can be managed using the techniques described herein.

FIG. 6 illustrates how the authorization list 358 can be managed to control which security fobs 110 are authorized (or de-authorized) with respect to controlling the security status of a product display assembly 100. FIG. 6 shows an example authorization list 358 that identifies the fob UIDs for a number of authorized security fobs 110. Through execution of program 356 in combination with the sequenced connections/disconnections of the manager security fob 108 and user security fob 110, the processor 350 can add a given security fob's fob UID to the authorization list 358. By way of example, FIG. 6 shows a step 600 where the process flow of FIG. 4 is used to add Key Fob i to the authorization list 358 (where the updated authorization list 358 is shown below step 600). Once the fob UID 212 for Key Fob i has been added to the authorization list 358, that Key Fob i can be used to control the security status of the subject product display assembly 100.

Figure 7:
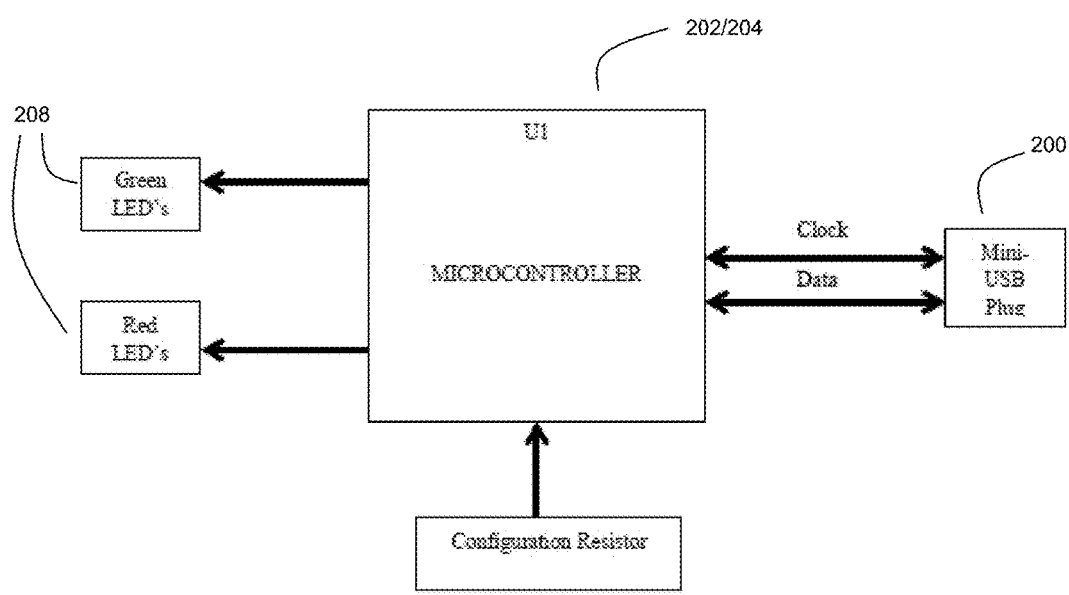
FIG. 7 depicts an example embodiment of a security fob.

FIG. 7 discloses another example embodiment of a security fob 108/110, which can be referred to as an "I-Key" for plugging into a puck assembly 302. As noted above, the puck assembly 302 can power the I-Key; e.g., provide voltage at +5 VDC.

The I-Key of FIG. 7 includes a processor in the form of a microcontroller ("U1") that boots up and communicates with the puck assembly 302 using I²C clock/data packets. These packets can be encrypted so that each serial data transaction is never the same across the I²C bus.

The I-Key also carries status LED's (D1 thru D4) that provide Red/Green indicators controlled by the microcontroller U1.

FIG. 7 also shows the use of a configuration resistor which can be used to set the I-Key as either a "Master Key" (e.g., manager fob 108) or a "User Key" (e.g., user security fob 110) using resistor stuffing techniques. The configuration resistor can be a resistor located on the fob 108/110 between two of the pins on the interface 200 (e.g., USB connector).

As indicated above, communication between the I-Key and the puck assembly 302 uses the I²C protocol, with the puck assembly as the master and the I-Key as slave.

Each I-Key is given a unique numerical identifier by the supplier (which can serve as the fob UID 212). When the I-key is inserted into the puck assembly 302, at that time, the puck assembly 302 initiates an encrypted data transfer. The I-Key responds to the puck with an encrypted data packet containing its numerical identifier and a code indicating whether it is a User Key or a Manager Key.

When a Manager Key is inserted into the puck assembly 302, the puck assembly 302 initiates a programming session and starts a 10 second timer. If the I-Key is removed before the timer expires the puck will enter "Add Key" mode. When the I-Key is removed, the timer is reset and any User Key inserted, before the timer expires, will be added to the puck assembly's nonvolatile memory as a valid User Key. The timer is reset whenever a User Key is inserted and removed. Finally, the "Add Key" mode ends when either the timer expires or the Manager Key is reinserted. Should the Manager Key be reinserted before the timer expires, the puck assembly will then enter "Delete Key" mode and all stored User Keys will be erased from the puck assembly's memory.

During operation, when the User key is inserted into the puck assembly, the puck assembly then compares the numerical identifier transmitted by the User Key to the identifiers in the puck assembly's nonvolatile memory, to verify that the User Key is a valid key. If the User Key identification matches one of the identifiers on the puck assembly's list of valid keys, then all normal key functions (arm, disarm, clear alarm) are allowed. Otherwise, if there is no match, the User Key is ignored.

A more detailed schematic of the I-Key of FIG. 7 is shown by FIG. 8. For example, the example embodiment of FIG. 8 shows examples of circuitry for the fob 108/110 that can be used to integrate the processor/memory 202/204 with the interface 200 and lights 208.

Figure 9:
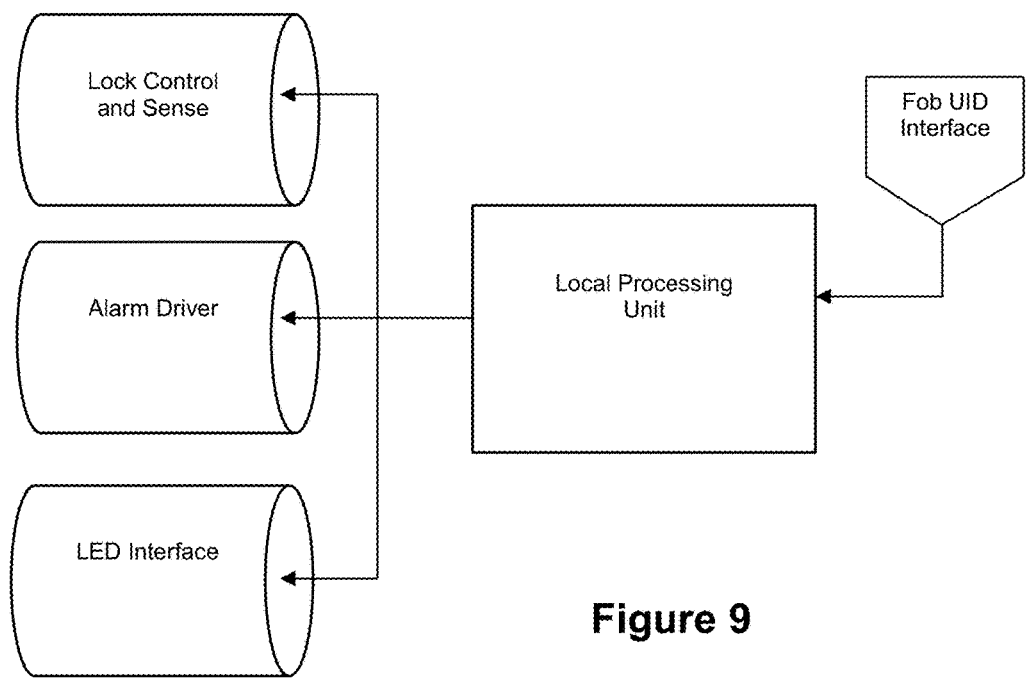
FIGS. 9-14 disclose example embodiments of security and related circuitry.
Figure 10:
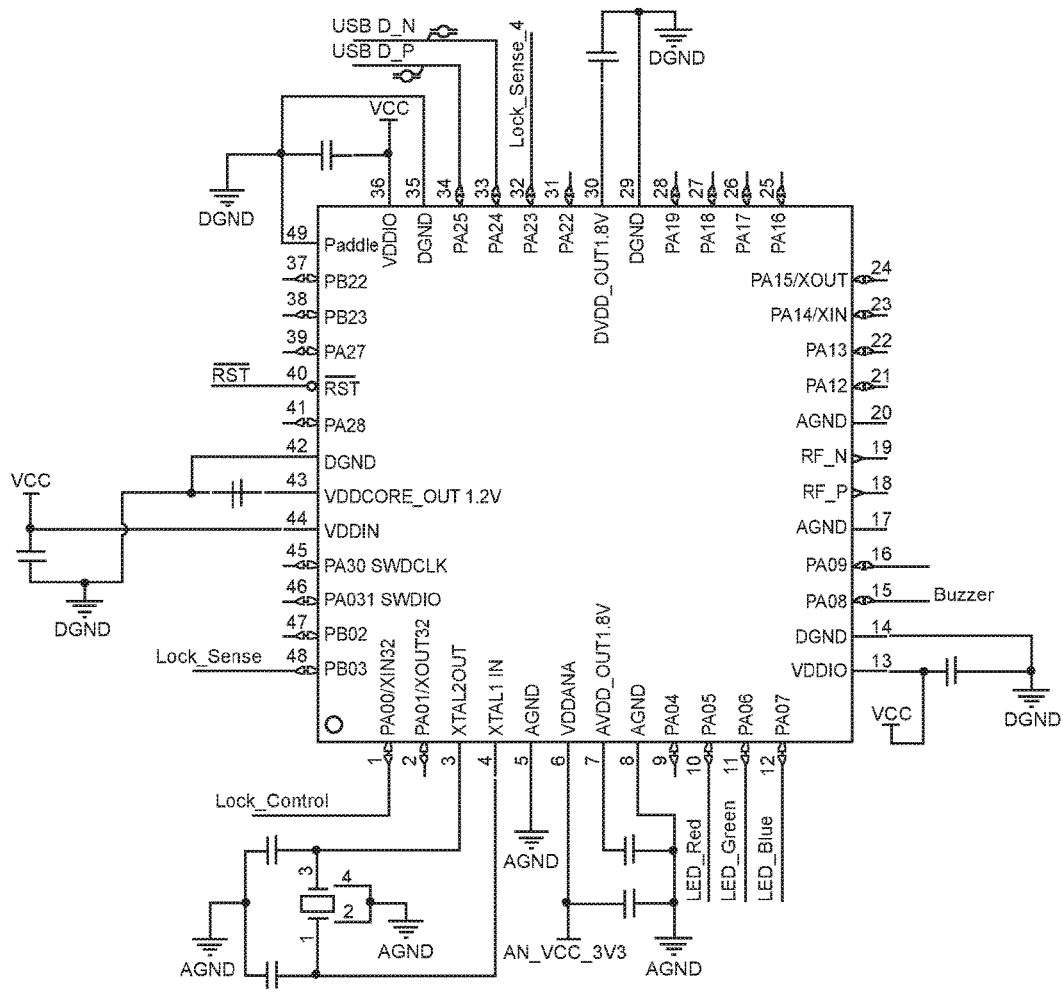
Figure 11:
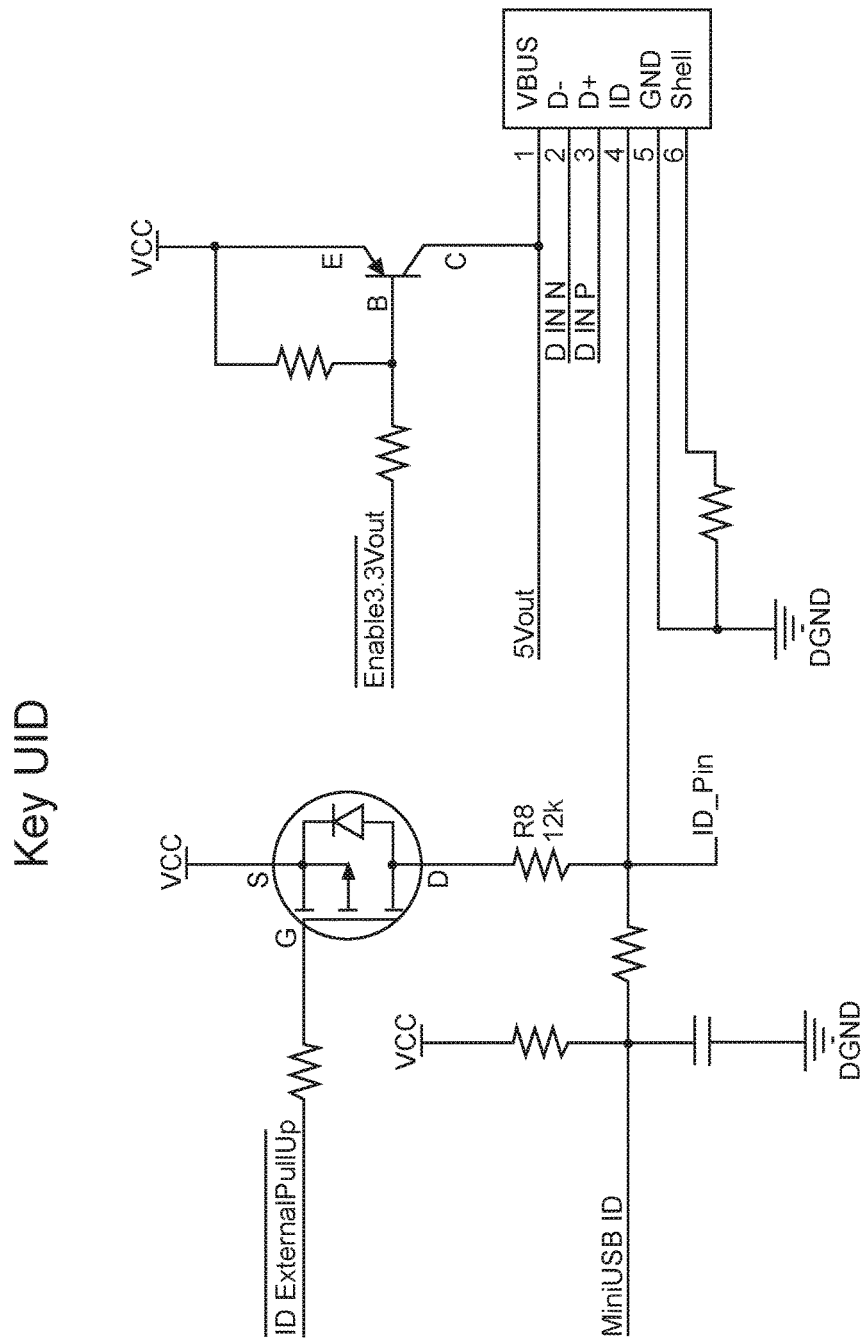
Figure 12:
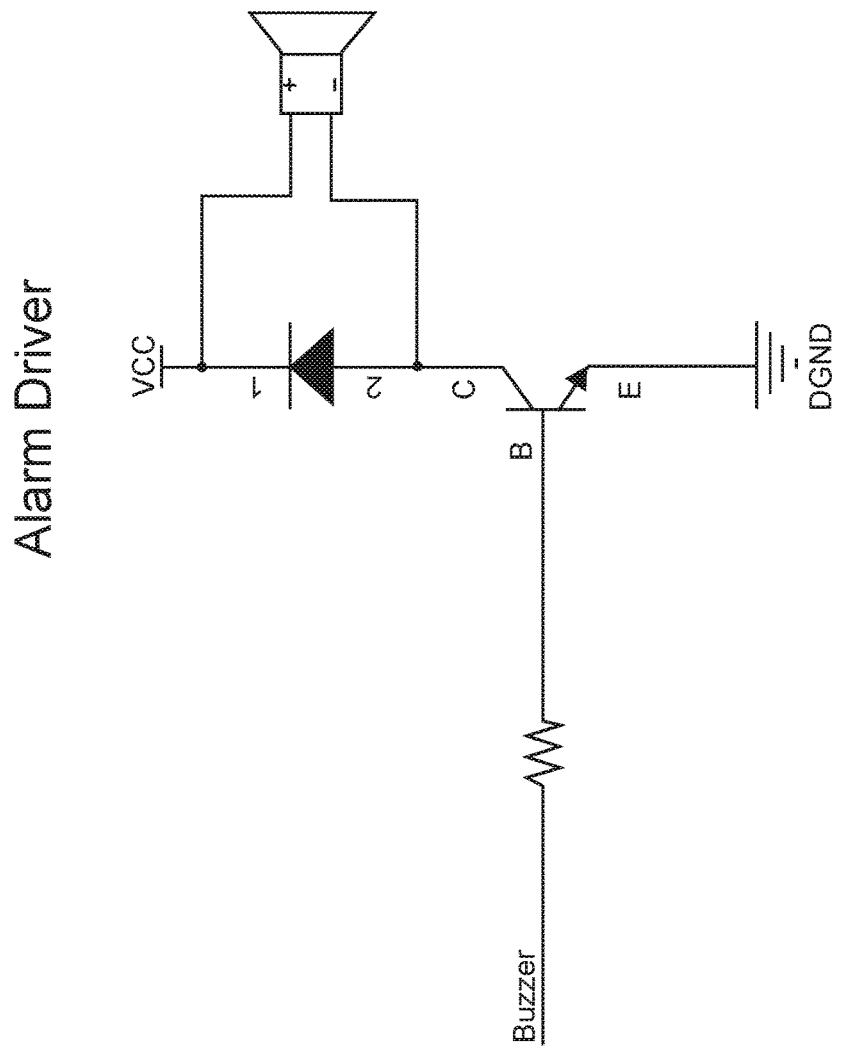
Figure 13:
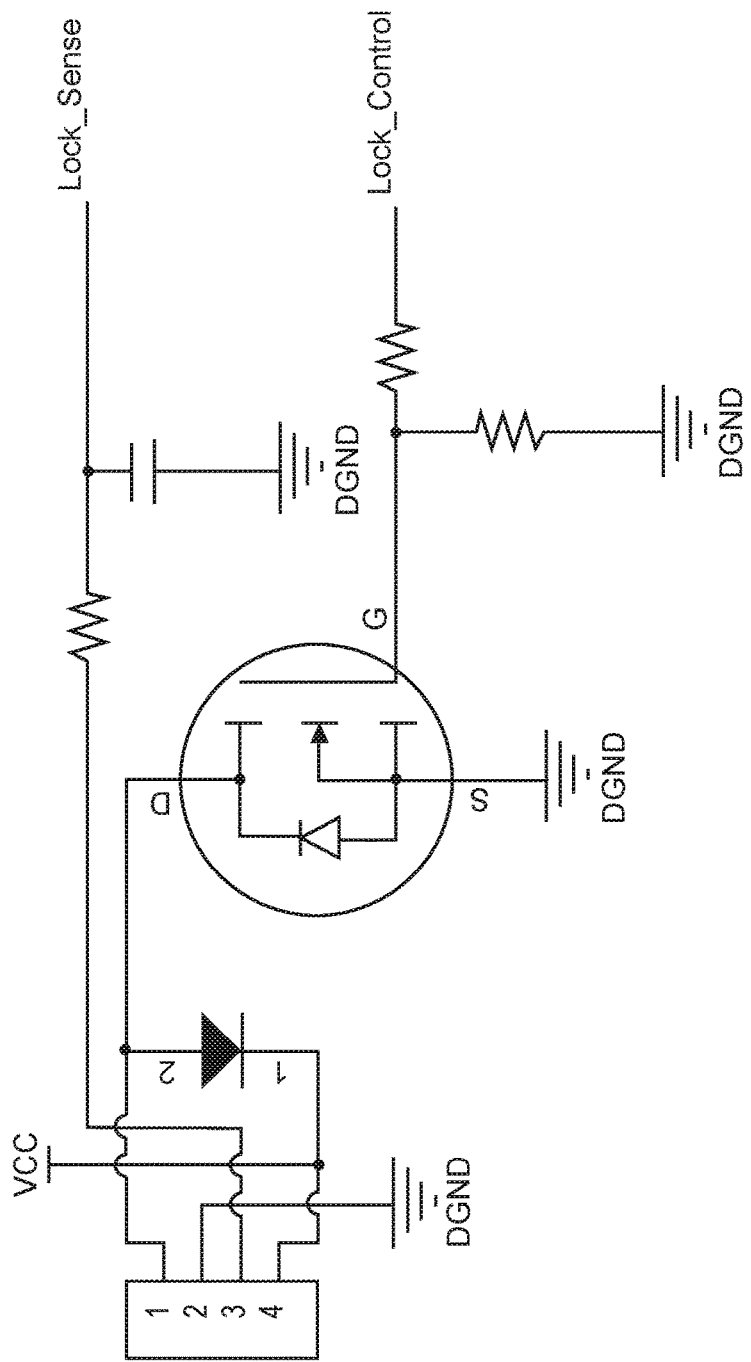
Figure 14:
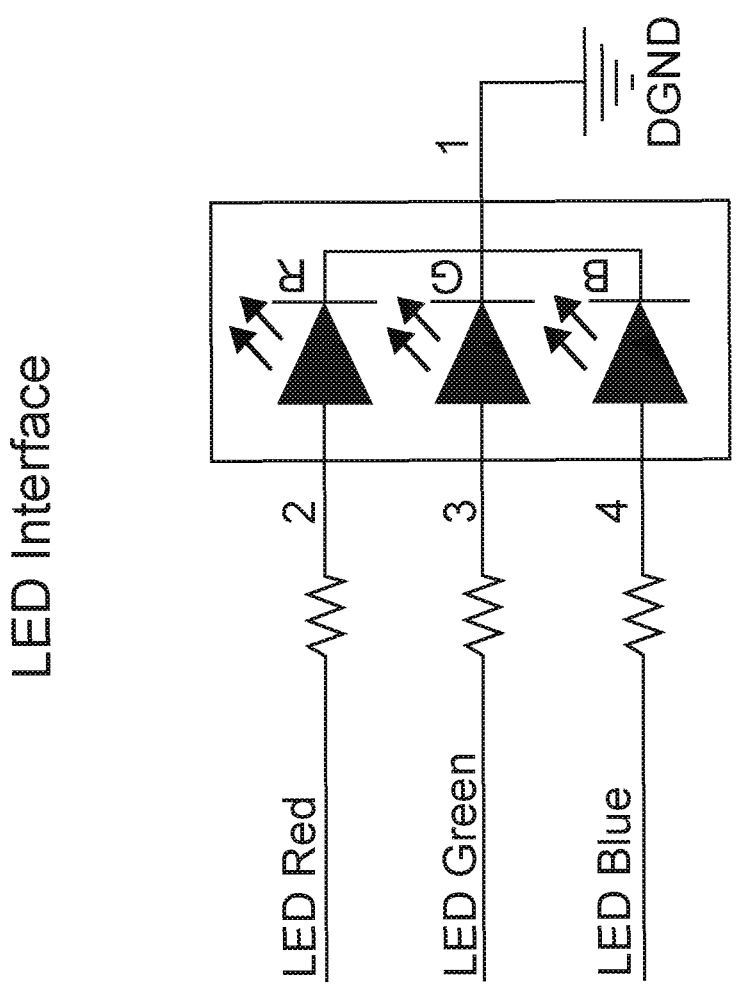

Examples of security circuitry 104 are shown by FIGS. 9-10 and 12-14. FIG. 9 shows an overview of the security circuitry 104. FIG. 10 shows a local processing unit that can be included with the security circuitry 104, where the local processing unit can be programmed receive a fob identifier 112 (via the interface shown by FIG. 11) and authenticate it against the authorization list. Upon verification of fob identifier, the local processing unit can control various security functions such as an alarm driver (see FIG. 12), a lock controller/sensor (see FIG. 13), and/or an LED interface (see FIG. 14).

It should be understood that other variations relative to the foregoing example embodiments can be employed by practitioners. For example, while the example embodiments discussed above describe the procedures attendant to the process flow of FIG. 4 being performed by the puck assembly 302 in response to a fob 108/110 being connected to a interface 320 resident on the puck assembly 302, it should be understood that other variations can be employed. For example, a processor or corresponding circuitry can be deployed in the base assembly 304 to perform the process flow of FIG. 4. Also, the interface 320 can be resident in the base assembly 304 rather than the puck assembly 302 if desired by a practitioner. To the extent there would be a need to communicate security status to components in the puck assembly 302, such communications could be achieved via the connection between the puck assembly 302 and the base assembly 304 when the puck assembly 302 is at rest, or they could be achieved via wireless communication between the puck assembly 302 and base assembly 304.

As another example of an alternate embodiment, the process flow of FIG. 4 could be implemented at least in part by a computer system remote from the fobs 108/110 and the product display assembly 100. For example, steps 400-428 can be performed by the remote computer system to manage the authorization list 358. Steps 400-406 and 430-442 could then be performed by the product display assembly 100 after the authorization list 358 has been transferred to memory within the product display assembly 100. Further still, fob authentication could also be performed by the computer system if desired by a practitioner. For example, while the techniques of managing the authorization list can be performed by the computer system using the process flow of steps 400-428 described above, the authentication process could be performed by the computer system using the techniques described in U.S. provisional patent application Ser. No. 62/323,511, filed Apr. 15, 2016 and entitled "Alarm Key System for Retail Security Display" and in U.S. patent application Ser. No. 15/488,379, filed this same day, entitled "Gateway-Based Anti-Theft Security System and Method" and published as U.S. Pat. App. Pub. 2017/0301199 , the entire disclosures of each of which are incorporated herein by reference.

As another example of an alternate embodiment, the security fobs 108/110 can take the form of badges or cards that include an RFID chip or other detectable indicia. The interface 320 could then take the form an RFID reader that emits a field over a short range. The RFID chip can be energized when in proximity to the RFID reader, and energization of the RFID chip via the RFID reader's field can cause the chip to emit its identifier. With such a system, the manager fob 108 can be brought into proximity with the RFID reader to start the timer, followed by bringing the security fob 110 to be whitelisted into proximity with the RFID reader before expiration of the timer. In still other alternate embodiments, the security fobs 108/110 can take the form of wireless computing devices such as smart phones or tablet computers and be used in a similar manner. Moreover, a mobile app executed by the wireless computing device can provide additional layers of control over the whitelisting of new fobs.

Further still, with respect to any of the foregoing embodiments, alternate anti-theft security systems can be used in place of or in conjunction with the product display assembly 100. For example, the anti-theft security systems can include cabinets, boxes, bins, and/or containers that are protected from open access via locks and the like. As an example, the security circuitry 104 discussed herein could be incorporated in such cabinets, boxes, bins, and/or containers (e.g., deployed within the locks that regulate access to the cabinets, boxes, bins, and/or containers).

While the invention has been described above in relation to its example embodiments, various modifications may be made thereto that still fall within the invention's scope. Such modifications to the invention will be recognizable upon review of the teachings herein.

What is claimed is:

1. An apparatus comprising:
   an anti-theft security system;
   wherein the anti-theft security system comprises an interface and security circuitry;
   wherein the security circuitry is configured to control a security status for the anti-theft security system based on an authentication of a security fob, the security circuitry including a hardware processor and a memory;
   wherein the memory is configured to store an authorization list, wherein the authorization list is configured to identify one or more identifiers for one or more security fobs that are authorized to control the security status of the anti-theft security system;
   wherein the hardware processor is configured to add an identifier for a user security fob to the authorization list in response to a defined sequence of interactions by the user security fob and a manager security fob with the interface, wherein the defined sequence of interactions comprises a connection of the manager security fob with the interface, followed by a disconnection of the manager security fob with the interface, followed a connection of the user security fob with the interface within a defined time window;
   wherein the security circuitry is further configured to read a fob identifier of a security fob connected to the interface;
   wherein the memory is further configured to store a software program for execution by the hardware processor in response to a connection of a security fob with the interface, wherein the software program comprises a plurality of processor-executable instructions that, upon execution by the hardware processor, are configured to cause the hardware processor to:
   determine whether the connected security fob corresponds to the manager security fob;
   in response to a determination that the connected security fob corresponds to the manager security fob, (1) start a timer that defines the time window, (2) determine whether the user security fob has been connected with the interface before expiration of the defined time window, and (3) in response to a determination that the user security fob has been connected with the interface before the expiration of the defined time window, add an identifier for the user security fob to the authorization list; and
   in response to a determination that the connected security fob does not correspond to the manager security fob, (1) compare the read fob identifier with the authorization list, and (2) in response to the comparison resulting in a determination that the read identifier matches an identifier on the authorization list, permit the connected security fob to control the security status for the anti-theft security system.

2. The apparatus of claim 1 wherein the anti-theft security system comprises a product display assembly adapted to receive a product for display to a consumer.

3. The apparatus of claim 2 wherein the connection of the user security fob with the interface within the defined time window occurs without an intervening re-connection of the manager security fob.

4. The apparatus of claim 2 wherein the hardware processor is further configured to delete the authorization list in response to a defined sequence of interactions by the manager security fob with the interface.

5. The apparatus of claim 4 wherein the defined sequence of interactions by the manager security fob with the interface for deleting the authorization list comprises a connection of the manager security fob with the interface, followed by a disconnection of the manager security fob with the interface, followed a re-connection of the manager security fob with the interface within a defined window after the disconnection of the manager security fob from the interface.

6. The apparatus of claim 2 wherein the product display assembly comprises:
   a puck assembly adapted to receive an electronic device; and
   a base assembly;
   wherein the puck assembly is adapted to be moveable between (1) a rest position in which the puck assembly engages with the base assembly and (2) a lift position in which the puck assembly disengages from the base assembly;
   wherein the puck assembly comprises (1) a puck assembly electrical contact, (2) puck assembly circuitry connected to the puck assembly electrical contact, wherein the puck assembly circuitry includes the security circuitry, (3) a security sensor, and (4) another interface connected to the puck assembly circuitry, the another interface adapted for connection with a power cable that is connectable to a power input of the electronic device;
   wherein the base assembly contact and the puck assembly contact are adapted to contact each other when the puck assembly is in the rest position to form an electrical connection between the puck assembly circuitry and the base assembly circuitry through which power is provided to the puck assembly;
   wherein the puck assembly circuitry is configured to, when the puck assembly is in the rest position, draw power from the power source through the electrical connection and provide the drawn power to the another interface for charging the electronic device via the power cable; and
   wherein the base assembly contact and the puck assembly contact are adapted to lose contact with each other when the puck assembly is in the lift position to thereby break the electrical connection.

7. The apparatus of claim 6 wherein the product display assembly further comprises:
   a tether assembly adapted to connect the puck assembly with the base assembly.

8. The apparatus of claim 2 further comprising the product.

9. The apparatus of claim 1 wherein the software program further comprises a plurality of processor-executable instructions that, upon execution by the hardware processor, are configured to cause the hardware processor to:
   in response to a determination that the connected security fob corresponds to the manager security fob, (1) determine whether the manager security fob has been re-connected with the interface before expiration of the defined time window, and (2) in response to a determination that the manager security fob has been re-connected with the interface before the expiration of the defined time window, remove the one or more identifiers from the authorization list.

10. The apparatus of claim 1 wherein the defined time window is a time duration between 5 seconds and 30 seconds.

11. The apparatus of claim 10 wherein the defined time window is a time duration of 10 seconds.

12. A system comprising:
an anti-theft security system; and
a plurality of security fobs, the security fobs including a manager security fob, wherein each security fob includes an identifier for that security fob;
wherein the anti-theft security system comprises an interface and security circuitry;
wherein the security circuitry is configured to control a security status for the anti-theft security system based on an authentication of a security fob, the security circuitry including a hardware processor and a memory;
wherein the memory is configured to store (1) a software program for execution by the hardware processor in response to a connection of a security fob with the interface, and (2) an authorization list, wherein the authorization list is configured to identify one or more identifiers for one or more security fobs that are authorized to control the security status of the anti-theft security system;
wherein the software program comprises a plurality of processor-executable instructions that, upon execution by the hardware processor, are configured to cause the hardware processor to:
receive an identifier for the connected security fob through the interface;
determine whether the connected security fob corresponds to a manager security fob;
in response to a determination that the connected security fob corresponds to the manager security fob, (1) start a timer that defines a time window, (2) determine whether another security fob has been connected with the interface before expiration of the defined time window, and (3) in response to a determination that another security fob has been connected with the interface before the expiration of the defined time window, add an identifier for the another security fob to the authorization list; and
in response to a determination that the connected security fob does not correspond to the manager security fob, (1) compare the received identifier with the authorization list, and (2) in response to the comparison resulting in a determination that the received identifier matches an identifier on the authorization list, permit the connected security fob to control the security status for the anti-theft security system.

13. The system of claim 12 wherein the interface comprises an anti-theft security system physical connector, and wherein each of a plurality of the security fobs comprise:
a security fob physical connector adapted to detachably connect with the anti-theft security system physical connector;
a security fob memory configured to store the identifier for that security fob; and
a security fob hardware processor configured to, in response to a detachable connection between the security fob physical connector and the anti-theft security system physical connector, (1) read the fob identifier from the security fob memory and (2) output data representative of the read fob identifier through the security fob physical connector.

14. The system of claim 13 wherein each of a plurality of the security fobs is a passive security fob that receives operating power from the anti-theft security system following a connection with the anti-theft security system.

15. The system of claim 13 wherein each of a plurality of the security fobs comprises one or more lights, and wherein the security fob hardware processor is further configured to (1) receive a message through the security fob physical connector, and (2) control illumination of the one or more lights based on the received message.

16. The system of claim 12 wherein the defined time window is a time duration between 5 seconds and 30 seconds.

17. The system of claim 16 wherein the anti-theft security system comprises a product display assembly, the product display assembly comprising:
a puck assembly adapted to receive an electronic device for display to a consumer; and
a base assembly;
wherein the puck assembly is adapted to be moveable between (1) a rest position in which the puck assembly engages with the base assembly and (2) a lift position in which the puck assembly disengages from the base assembly;
wherein the puck assembly comprises (1) a puck assembly electrical contact, (2) puck assembly circuitry connected to the puck assembly electrical contact, wherein the puck assembly circuitry includes the security circuitry, (3) a security sensor, and (4) another interface connected to the puck assembly circuitry, the another interface adapted for connection with a power cable that is connectable to a power input of the electronic device;
wherein the base assembly contact and the puck assembly contact are adapted to contact each other when the puck assembly is in the rest position to form an electrical connection between the puck assembly circuitry and the base assembly circuitry through which power is provided to the puck assembly;
wherein the puck assembly circuitry is configured to, when the puck assembly is in the rest position, draw power from the power source through the electrical connection and provide the drawn power to the another interface for charging the electronic device via the power cable; and
wherein the base assembly contact and the puck assembly contact are adapted to lose contact with each other when the puck assembly is in the lift position to thereby break the electrical connection.

18. The system of claim 12 wherein the hardware processor is further configured to delete the authorization list in response to a defined sequence of interactions by the manager security fob with the interface.

19. The system of claim 18 wherein the defined sequence of interactions by the manager security fob with the interface for deleting the authorization list comprises a connection of the manager security fob with the interface, followed by a disconnection of the manager security fob with the interface, followed a re-connection of the manager security fob with the interface within a defined window after the disconnection of the manager security fob from the interface.

20. A computer program product comprising:
a plurality of processor-executable instructions that are resident on a non-transitory computer-readable storage medium, wherein the instructions, upon execution by a hardware processor, are configured to cause the hardware processor to:

receive an identifier for a security fob connected to an interface that is in communication with the hardware processor;

determine whether the connected security fob corresponds to a manager security fob;

in response to a determination that the connected security fob corresponds to the manager security fob, (1) start a timer that defines a time window, (2) determine whether another security fob has been connected with the interface before expiration of the defined time window, and (3) in response to a determination that another security fob has been connected with the interface before the expiration of the defined time window, add an identifier for the another security fob to an authorization list, wherein the authorization list is configured to identify one or more identifiers for one or more security fobs that are authorized to control a security status of an anti-theft security system; and in response to a determination that the connected security fob does not correspond to the manager security fob, (1) compare the received identifier with the authorization list, and (2) in response to the comparison resulting in a determination that the received identifier matches an identifier on the authorization list, permit the connected security fob to control the security status for the anti-theft security system.

21. The computer program product of claim 20 wherein the defined time window is a time duration between 5 seconds and 30 seconds.

22. The computer program product of claim 20 wherein the instructions, upon execution by a hardware processor, are configured to cause the hardware processor to:

in response to a determination that the connected security fob corresponds to the manager security fob, (1) determine whether the manager security fob has been re-connected with the interface before expiration of the defined time window, and (2) in response to a determination that the manager security fob has been re-connected with the interface before the expiration of the defined time window, remove the one or more identifiers from the authorization list.

23. A method comprising:

connecting a manager security fob with an interface, the interface for cooperation with a hardware processor that manages an authorization list for an anti-theft security system, the authorization list for listing one or more identifiers for one or more security fobs that are authorized to control a security status for the anti-theft security system;

disconnecting the manager security fob from the interface;

in response to the connecting or the disconnecting, starting a timer, the timer defining a time window;

connecting a user security fob with the interface;

the hardware processor reading an identifier for the connected user security fob through the interface;

the hardware processor determining that the user security fob connecting occurred before expiration of the defined time window;

in response to the determination that the user security fob connecting occurred before expiration of the defined time window, the hardware processor adding the read identifier to the authorization list to thereby authorize the user security fob for use in controlling the security status of the anti-theft security system;

subsequently re-connecting the user security fob with the interface; and in response to the re-connecting, the hardware processor (1) reading the identifier for the re-connected user security fob through the interface, (2) comparing the read identifier for the re-connected user security fob with the authorization list, and (3) in response to the comparison resulting in a determination that the read identifier for the re-connected user security fob matches an identifier on the authorization list, permitting the re-connected user security fob to control the security status for the anti-theft security system.

24. The method of claim 23 further comprising:

determining that the connected manager security fob corresponds to a manager security fob; and conditioning performance of the adding step on the determination that the connected manager security fob corresponds to the manager security fob.

25. The method of claim 23 wherein the hardware processor is resident in the anti-theft security system.

26. The method of claim 23 wherein the connecting steps rely on wireless connections.

27. The method of claim 23 wherein the connecting of the user security fob with the interface within the defined time window occurs without an intervening re-connection of the manager security fob.

28. The method of claim 23 wherein the anti-theft security system comprises a product display assembly, the product display assembly comprising:

a puck assembly adapted to receive an electronic device for display to a consumer; and a base assembly;

wherein the puck assembly is adapted to be moveable between (1) a rest position in which the puck assembly engages with the base assembly and (2) a lift position in which the puck assembly disengages from the base assembly;

wherein the puck assembly comprises (1) a puck assembly electrical contact, (2) puck assembly circuitry connected to the puck assembly electrical contact, wherein the puck assembly circuitry includes the security circuitry, (3) a security sensor, and (4) another interface connected to the puck assembly circuitry, the another interface adapted for connection with a power cable that is connectable to a power input of the electronic device;

wherein the base assembly contact and the puck assembly contact are adapted to contact each other when the puck assembly is in the rest position to form an electrical connection between the puck assembly circuitry and the base assembly circuitry through which power is provided to the puck assembly;

wherein the puck assembly circuitry is configured to, when the puck assembly is in the rest position, draw power from the power source through the electrical connection and provide the drawn power to the another interface for charging the electronic device via the power cable; and wherein the base assembly contact and the puck assembly contact are adapted to lose contact with each other when the puck assembly is in the lift position to thereby break the electrical connection.

29. The method of claim 23 further comprising:

the hardware processor deleting the authorization list in response to a defined sequence of interactions by the manager security fob with the interface.

30. The method of claim 29 wherein the defined sequence of interactions by the manager security fob with the interface for deleting the authorization list comprises connecting the manager security fob with the interface, followed by disconnecting the manager security fob with the interface, followed re-connecting the manager security fob with the interface within a defined window after the disconnection of the manager security fob from the interface.

* * * * *